US008090674B2

(12) United States Patent
Ginosar et al.

(10) Patent No.: US 8,090,674 B2
(45) Date of Patent: Jan. 3, 2012

(54) INTEGRATED SYSTEM AND METHOD FOR MULTICHANNEL NEURONAL RECORDING WITH SPIKE/LFP SEPARATION, INTEGRATED A/D CONVERSION AND THRESHOLD DETECTION

(75) Inventors: Ran Ginosar, Nofit (IL); Yevgeny Perelman, Haifa (IL)

(73) Assignee: Technion Research and Development Foundation, Ltd., Haifa (IL)

( * ) Notice: Subject to any disclaimer, the term of this patent is extended or adjusted under 35 U.S.C. 154(b) by 742 days.

(21) Appl. No.: 11/571,610

(22) PCT Filed: Jul. 6, 2005

(86) PCT No.: PCT/IL2005/000718
§ 371 (c)(1),
(2), (4) Date: Oct. 22, 2008

(87) PCT Pub. No.: WO2006/003663
PCT Pub. Date: Jan. 12, 2006

(65) Prior Publication Data
US 2009/0091377 A1    Apr. 9, 2009

(51) Int. Cl.
*G06F 17/00* (2006.01)
*G06N 5/04* (2006.01)
(52) U.S. Cl. ........................................... 706/60
(58) Field of Classification Search ............ 706/60
See application file for complete search history.

(56) References Cited

U.S. PATENT DOCUMENTS 6,993,392 B2 *   1/2006   Nicolelis et al. ............... 607/45
7,983,756 B2 *   7/2011   Nicolelis et al. ............... 607/45

OTHER PUBLICATIONS

Analysis of the Line-Frequency Electric Field Intensity around EHV Transmission, Fei Wang; Weijie Wang; Zhichao Jiang; Xuezeng Zhao; Electrical and Control Engineering (ICECE), 2010 International Conference on Digital Object Identifier: 10.1109/iCECE. 2010.815 Publication Year: 2010 , pp. 3343-3346.*
Experimental test of the role of ion-ion instability in determining ion loss from a two-species plasma, Hershkowitz, N.; Chi-Shung Yip; Severn, G.D.; Plasma Science, 2010 Abstracts IEEE International Conference on Digital Object Identifier: 10.1109/PLASMA.2010. 5534417 Publication Year: 2010 , p. 1.*

(Continued)

*Primary Examiner* — Michael B Holmes
(74) *Attorney, Agent, or Firm* — Law Offices of Edward Langer

(57) ABSTRACT

A CMOS integrated circuit for multi-channel neuronal recording with twelve true-differential channels, band separation and digital offset calibration. The recorded signal is separated into 2 bands: a low-frequency, local field potential (LFP); and high-frequency spike data. Digitally programmable gains for the LFP and spike bands are provided. A mixed-signal front-end processor for multi-channel neuronal recording is also described. It receives twelve differential-input channels of implanted recording electrodes. A programmable cutoff HPF blocks DC and low frequency input drift at about 1 Hz. The signals are band-split at about 200 Hz to low-frequency local field potential (LFP) and high-frequency spike data (SPK), which is band limited by a programmable-cutoff LPF. The analog signals are converted into digital form, and streamed out over a serial digital bus at up to 8 Mbps. A special interface system incorporating an embedded CPU core in a programmable logic device accompanied by real-time software allows connectivity to a computer host.

23 Claims, 21 Drawing Sheets

OTHER PUBLICATIONS

Low-Voltage Distribution Network Theoretical Line Loss Calculation System Based on Dynamic Unbalance in Three Phrases, Ni Feng; Yu Jianming; Electrical and Control Engineering (ICECE), 2010 International Conference on Digital Object Identifier: 10.1109/iCECE.2010.1290 Publication Year: 2010 , pp. 5313-5316.*

Interpretation of Natural Language Database Queries Using Optimization Methods, Leigh, W.; Evans, J.; Systems, Man and Cybernetics, IEEE Transactions on vol. 16 , Issue: 1 Digital Object Identifier: 10.1109/TSMC.1986.289280 Publication Year: 1986 , pp. 40-52.*

Q. Bai et al., "A high-yield microassembly structure for three-dimensional microelectrode arrays," IEEE Trans. Biomed Eng., vol. 47, No. 3, pp. 281-289, Mar. 2000.

E. M. Maynard et al., "The utah intracortical electrode array: a recording structure for potential brain-computer interfaces," Electroencephalography and clinical Neurophysiology, vol. 102, pp. 228-239,1997.

M. Nicolelis, "Actions from thoughts," Nature, vol. 409, pp. 403-407, 2001. R. R. Harrison, "A low-power integrated circuit for adaptive detection of action potentials in noisy signals," in Proc. of the 25-th Annual International Conference of the IEEE EMBS, Sep. 2003, pp. 3325-3328.

M. S. Lewicki, "A review of methods for spike sorting: the detection and classification of neural action potentials," Network: Computation in Neural Systems, vol. 9, No. 4, pp. R53-R78, 1998.

Z. S. Zumsteg et al., "Power feasibility of implantable digital spike-sorting circuits for neural prosthetic systems," in Proc. of the 26-th Annual International Conference of the IEEE EMBS, Sep. 2004, pp. 4237-4240.

D. A. Borkholder, "Cell based biosensors using microelectrodes," Ph.D. dissertation, Univ. of Stanford, Nov. 1998.

K. Guillory et al., "A 100-channel system for real time detection and storage of extracellular spike waveforms," Journal of Neuroscience Methods, vol. 91, pp. 21-29, 1999.

I. Obeid et al., "Two multichannel integrated circuitsfor neural recording and signal processing," IEEE Trans. on Biomed. Eng., vol. 50, No. 2, pp. 255-258,Feb. 2003.

A. Arieli et al., "Dynamics of ongoing activity: Explanation of the large variability in evoked cortical responses," Science, vol. 273, pp. 1868-1871, Sep. 1996.

J. P. Donoghue, J. N. Sanes, N. G. Hatsopoulos, and G. Gaal, "Neural discharge and local field potential oscillations in primate motor cortex during voluntary movements," The Journal of Neurophysiology, vol. 79, No. 1, pp. 159-173, Jan. 1998.

R. R. Harrison et al., "A low-power low-noise cmos amplifier for neural recording applications," IEEE Journal of Solid State Circuits, vol. 38, No. 6, pp. 958-965, Jun. 2003.

W. R. Patterson et al., "A microelectrode/microelectronic hybrid device for brain implantable neuroprosthesis applications," IEEE Trans. on Biomed. Eng., vol. 51, No. 10, Oct. 2004.

P. Mohseni et al. "A fully integrated neural recording amplifier with dc input stabilization," IEEE Trans. on Biomed. Eng., vol. 51, No. 5, May 2001.

R. Lemon, Methods for Neuronal Recording in Conscious Animals. International Brain Research Organization, 1984.

T. L. Deliyannis et al., Continuous-Time Active Filter Design. CRC Press, 1999.

A. B. Schwarz et al., "Corbel neural prosthetics," Annual review of Neuroscience, vol. 27, pp. 487-507, 2004.

M. Black et al., "Connecting brains with machines: the neural control of 2d cursor movement," in First International IEEE EMBS Conference on Neural Engineering, 2003.

K. Oweiss et al., "A systems approach for real-time data compression in advanced brain-machine interfaces," in Proc. of 2nd Int. IEEE EMBS Conf. Neural Eng., Mar. 2005, pp. 62-65.

Y. Perelman et al. (2004) Analog front-end IC for multi-channel neuronal recording system with Spike and LFP separation. CCIT Tech. Report 513. [Online]. Available: http://www.ee.technion.ac.il/˜ran.

A. Zviagintsev et al., "Low power architectures for spike sorting," in Proc. of 2nd Int. IEEE EMBS Conf. Neural Eng., Mar. 2005, pp. 162-165.

A. Zviagintsev et al., "Low power spike detection and alignment algorithm," in Proc. of 2nd Int. IEEE EMBS Conf. Neural Eng., Mar. 2005, pp. 317-320.

T. Horiuchi et at "A low-power CMOS neural amplifier with amplitude measurements for spike sorting," in ISCAS, 2004.

C. Mehring et al., "Inference of hand movements from local field potentials in monkey motor cortex," Nature Neuroscience, vol. 6, No. 12, pp. 1253-1254, 2003.

T. Instruments. (2004) TMS320C6000 DSP multichannel buffered serial port (McBSP) reference guide. [Online]. Available: http://ti.com.

Y. Perelman et al.. (2005) A low power inverted ladder d/a converter. [Online]. Available: http://www.ee.technion.ac.il/˜ran.

Q. Bai et al., "Single-unit neural recording with active microelectrode arrays," IEEE Trans. Biomed. Eng., vol. 48, No. 8, pp. 911-920, Aug. 2001.

R. Olsson et al., "A fully-integrated bandpass amplifier for extracellular neural recording," in Proc. of the 1st Int. IEEE EMBS Conf. Neural Eng., Mar. 2003, pp. 165-168.

D. Chen et al., "A bio-amplifier with pulse output," in 26th Ann. Intrn. Conf. IEEE EMBS, Proc., Sep. 2004.

M. Steyaert et al., "A micropower low-noise monolithic instrumentation amplifier for medical purposes," IEEE Journal of Solid State Circuits, vol. 22, No. 6, pp. 1163-1168, 1987.

* cited by examiner

TABLE I
ELECTRICAL TEST RESULTS SUMMARY

| | |
|---|---|
| SPK gain | 77 dB |
| Output LPF cutoff | 8-12 kHz |
| Band splitter corner | 330 Hz |
| SPK RMS noise | 3.1 µV |
| LFP gain | 58 dB |

Fig. 4

INTEGRATED SYSTEM AND METHOD FOR MULTICHANNEL NEURONAL RECORDING WITH SPIKE/LFP SEPARATION, INTEGRATED A/D CONVERSION AND THRESHOLD DETECTION

FIELD OF THE INVENTION

The present invention relates generally to systems for recording of neuronal signals, and more particularly to an integrated system for multi-channel neuronal recording with spike/LFP separation, integrated A/D conversion and threshold detection

BACKGROUND OF THE INVENTION (For relevant technical literature, see the listing prior to the claims section).

Recent advances in fabrication of MEMS microelectrode arrays, together with the ability to couple the arrays directly to VLSI chips, allow simultaneous monitoring of tens and even hundreds of neurons. Moreover, clinical applications of brain-machine interfaces may require monitoring of much larger populations, even hundreds and thousands of neurons. With this large a number of recording units, communicating raw neuronal signals results in prohibitively large data rates. When sampled with 20 Ksps, eight bit precision, even a hundred electrodes would generate 16 Mbps, too large for common methods of low-power wireless communications. Evidently, some form of data reduction must be applied prior to communication.

It is possible to detect the presence of neuronal spikes and communicate only active portions of recorded signals. Assuming an electrode might "sense" two or three units which fire 20 times per second on average, and taking the firing event length to be 2 msec, a data rate reduction of only one-tenth can be achieved. Further reduction can be provided by restricting the communicated information to mere indications of spike presence.

An extra-cellular microelectrode typically senses activity from several units adjacent to its tip. Spike sorting applies classification techniques to assign spike waveforms of different shapes to different units. With on-chip spike sorting, the data bandwidth is reduced to 200 Kbps (almost down to one-hundreth) for the values above, assuming a 32 bit message generated for every spike.

In the prior art, another reason is known for on-chip sorting. In autonomous motor prosthetics, assuming that every spike coming from a certain electrode is generated by the same unit might prove insufficiently accurate for movement trajectory calculations. It is also known that implementation of existing algorithms for on chip spike sorting is feasible in terms of power dissipation.

In a signal recorded by an extra-cellular microelectrode, neuronal firing activity occupies the 100-10.000 Hz frequency band. Its amplitude is typically lower than 500 μV. The Local Field Potential (LFP) occupies the lower frequencies, below 100 Hz, with amplitudes below 5 mV. The signal-to-noise ratio of the combined signal is rather large. As the microelectrode noise and background noise of cortical activity are typically 5 μV, it may reach 60 dB.

Since the LFP must be filtered out prior to spike sorting, it is possible to block it right at the front-end by high-pass filtering below 100 Hz. It has been shown, however, that LFP carries important information. Several known front-end circuits pass the LFP band intact. They block the large input DC offsets, typical for neuronal signals, by high-pass filtering below 1 Hz. As the entire combined signal is passed, the minimal required precision of subsequent data acquisition is 10 bits, defined by the signal-to-noise ratio (SNR). The maximal gain is limited by the LFP magnitude and chip supply voltage. Since the firing activity (SPK) has ten times lower magnitude than the LFP, it can be amplified to only one tenth of the output swing.

Availability of multi-site neuronal electrodes, such as the Michigan probe or the Utah array, has enabled the development of highly integrated, multi-channel recording devices with large channel counts. These devices are of importance to various aspects of neurophysiological research.

Multi-site electrodes can potentially provide for simultaneous monitoring of hundreds and even thousands of neurons. The raw data rates that are generated by such populations are large. When sampled at 20 Ksps, with eight bit precision, a hundred electrodes would generate a raw data rate of 16 Mbps. Communicating such volumes of neuronal data over battery-powered wireless links, while maintaining reasonable battery life, is hardly possible with common methods of low-power wireless communications. Evidently, some form of data reduction must be applied. One possible way is to utilize some form of "lossy" data compression to reduce the raw waveform data capacity.

A method employing Wavelet Transform has been suggested. Alternatively, one might extract the significant features of the neuronal signal and limit the transmitted data to those features only. For example, it is possible to detect the presence of neuronal spikes and communicate only active portions of recorded signals, which may lead to an order of magnitude reduction in the required data rate.

Another order of magnitude reduction can be achieved if the neuronal spikes are sorted on the chip and only the notifications of spike events are transmitted to the host. Power feasibility of on-chip spike sorting with common sorting algorithms that are usually software-based has been verified. Adapting these algorithms for utilization in VLSI can yet lead to significant power savings, with only a minor sacrifice of accuracy. It has been suggested to measure and communicate only certain features of the incoming spikes. The spike sorting can subsequently operate on these features.

It would therefore be advantageous to provide an integrated system for multi-channel neuronal recording with spike/LFP separation, integrated A/D conversion and threshold detection.

SUMMARY OF THE INVENTION

Accordingly, it is a principal object of the present invention to provide an integrated system for multi-channel neuronal recording with spike/LFP separation, integrated A/D conversion and threshold detection.

It is another object of the present invention to provide a system that splits the signal into two bands after the first amplification stage.

It is one other object of the present invention to provide an integrated CMOS front-end for neuronal recordings from implanted electrodes capable of delivering both spike data and the local field potential from multiple true-differential recording channels.

It is one more object of the present invention to provide further integration of a head-stage with an external wireless interface.

It is still another object of the present invention to provide an integrated wireless recording device capable of acquiring neuronal activity over a large number of channels.

It is one further object of the present invention to provide digitizing, data reduction and communication over a bi-directional wireless link.

A CMOS integrated circuit for multi-channel neuronal recording with twelve true-differential channels, band separation and digital offset calibration is disclosed. The recorded signal is separated into 2 bands: a low-frequency, local field potential (LFP); and high-frequency spike data. Digitally programmable gains of up to 60 and 80 dB for the LFP and spike bands are provided. DC offsets are compensated on both bands by means of digitally programmable DAC's. The spike band is limited by a second order low-pass filter with a digitally programmable cutoff frequency. The IC has been fabricated and tested. Input referred noise of 3 μv on the spike data band was measured.

A mixed-signal front-end processor for multi-channel neuronal recording is also described. It receives twelve differential-input channels of implanted recording electrodes. A programmable cutoff HPF blocks DC and low frequency input drift at about 1 Hz. The signals are band-split at about 200 Hz to low-frequency local field potential (LFP) and high-frequency spike data (SPK), which is band limited by a programmable-cutoff LPF, in a range of 8-13 kHz. Amplifier offsets are compensated by 5-bit calibration DAC's. The SPK and LFP channels provide variable amplification rates of up to 5000 and 500, respectively. The analog signals are converted into 10-bit digital form, and streamed out over a serial digital bus at up to 8 Mbps. A threshold filter optionally suppresses inactive portions of the signal and emits only spike segments of programmable length. A prototype has been fabricated on a 0.35 μm CMOS process and tested successfully, demonstrating a 3 μV noise level. A special interface system incorporating an embedded CPU core in a programmable logic device accompanied by real-time software has been developed to allow connectivity to a computer host.

The present invention provides a multi-channel neuronal recording front-end integrated circuit, fabricated in 0.35 μm standard CMOS process. The front-end acquires neuronal signals from twelve true-differential recording channels, performs analog signal conditioning including separation of spike and Local-Field-Potential frequency bands, digitizes the outputs and transmits the data to the host over a serial bus. An on-chip controller provides a level of data reduction by thresholding the incoming signals and transmitting only the "active" signal portions, i.e. segments of signals immediately following threshold crossing events.

The front-end is preferably integrated with spike-sorting hardware and a wireless modem on the PCB level prior to full VLSI integration.

Separating the LFP and the SPK bands at the analog portion of the front-end may have certain advantages, as it reduces the dynamic range requirements on the last front-end stages. In a signal recorded by an extra-cellular microelectrode, neuronal firing activity occupies the 100-10,000 Hz frequency band. Its amplitude is typically lower than 500 μV. The Local Field Potential (LFP) occupies the lower frequencies, below 100 Hz, with amplitudes below 5 mV. The signal-to-noise (SNR) ratio of the combined signal is rather large, since the microelectrode noise and background noise of cortical activity are typically 5 μV and the SNR may reach 60 dB.

Since the LFP preferably is filtered out prior to spike sorting, it is possible to block it right at the front-end, by high-pass filtering below 100 Hz. It is commonly indicated, however, that LFP carries important information. Thus the recording device should preferably make this information available together with the spike data. Several front-end circuits pass the LFP band intact. They block the large input DC offsets, typical of neuronal signals, by high-pass filtering below 1 Hz. As the entire combined signal is passed, the minimal required precision of the subsequent data acquisition is 10 bits, defined by the signal SNR. The maximal gain is limited by the LFP magnitude and chip supply voltage. Since the firing activity (SPK) has ten times lower magnitude than the LFP, it can be amplified only to one tenth of the output swing.

Splitting the signal into two bands after the first amplification stage allows separate processing of the LFP and SPK bands, amplifying both to the full swing. Consequently, the system dynamic range needs only be 100, as determined by the SNR of the SPK signal, and acquiring only seven bits of data is required.

There has thus been outlined, rather broadly, the more important features of the invention in order that the detailed description thereof that follows hereinafter may be better understood. Additional details and advantages of the invention will be set forth in the detailed description, and in part will be appreciated from the description, or may be learned by practice of the invention.

BRIEF DESCRIPTION OF THE DRAWINGS

For a better understanding of the invention with regard to the embodiments thereof, reference is made to the accompanying drawings, in which like numerals designate corresponding elements or sections throughout, and in which:

FIG. 4 is a table summarizing electrical test results;

DETAILED DESCRIPTION OF A PREFERRED EMBODIMENT

The principles and operation of a method and an apparatus according to the present invention may be better understood with reference to the drawings and the following description, it being understood that these drawings are given for illustrative purposes only and are not meant to be limiting.

Figure 1:
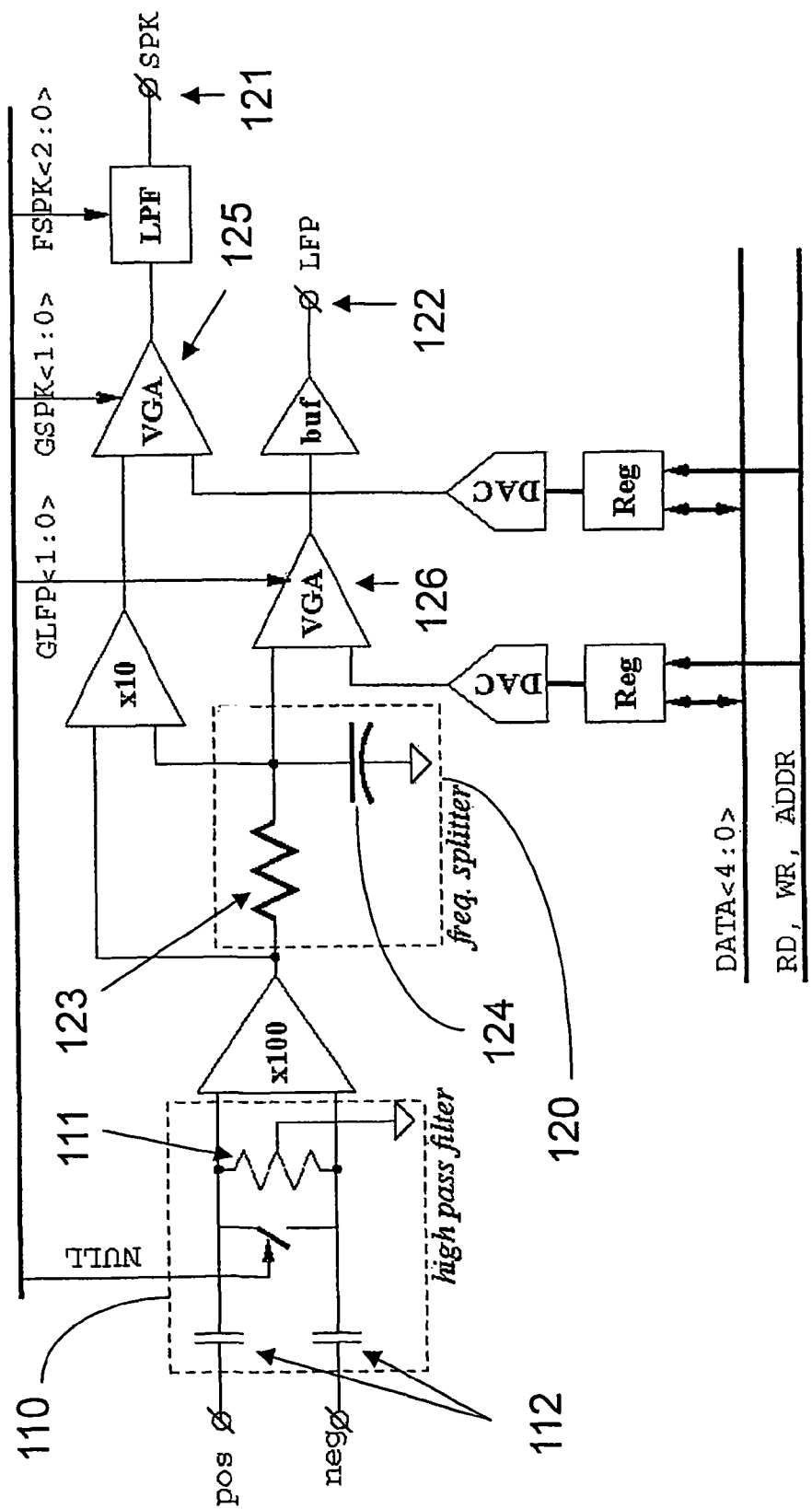
FIG. 1 is a schematic diagram of a single channel integrated system for neuronal recording with spike/LFP separation, integrated A/D conversion and threshold detection, constructed in accordance with the principles of the present invention.

FIG. 1 is a schematic diagram of the chip architecture for a single channel integrated system for neuronal recording with spike/LFP separation, integrated A/D conversion and threshold detection, constructed in accordance with the principles of the present invention. A 0.35 μm CMOS twelve-channel neuronal recording front-end IC was designed with true-differential inputs, so that each electrode can be referenced to any point in the system. The amplification channel was designed to have an RMS noise level of 2-3μV in the band of 0.2-10 kHz.

The input signal is first cleared of the DC offsets by a single-pole input high-pass filter 110. The corner frequency should be of several Hertz, in order to pass the LFP part of the signal intact. The 8 MΩ resistors 111 were placed on-chip, whereas the capacitors 112 are preferably added externally. As the IC was intended to couple to 0.1-1 MΩ electrodes, 8 MΩ input resistance 111 is not too much of a load.

The first stage provides an amplification of 40 dB to a single-ended output, which is band-split by a first-order RC filter 120 into high frequency neuronal firing activity (SPK) 121 and low frequency LFP 122 parts. The splitter pole was roughly placed at 200 Hz, by using a 5 MΩ) resistor 123 (high-resistive poly) and 160 pF (gate-oxide) capacitor 124.

The minimal gain to be provided by the first stage is determined by noise constraints as follows. RMS noise introduced by the resistor into the signal (at room temperature) is:

$$\sqrt{4kTRf_0} = 28 \text{ μV}$$

assuming output LPF has a steep roll-off above $f_0$=10 kHz. The first stage gain is required to be well above 20 dB in order to keep the input referred noise of the high splitter resistance below 3 μV. First stage gain of 40 dB was used as a design goal.

The low frequency LFP signal is amplified by a variable-gain amplifier (VGA) 126 and buffered to chip outputs. The VGA provides digitally selectable gains of 2.5/517.5/10×. Thus, the maximum total gain of the LFP channel was designed to be 60 dB.

The high frequency SPK signal is amplified by a factor of ten and by another VGA 125 (to a total maximum of 80 dB). Its uppermost frequency is limited by a second-order Bessel LPF, implemented (for the sake of simplicity) as a continuous time Sallen-Key RC biquad. Resistors are implemented as serially-connected polysilicon segments, which can be selectively shortened by means of a three-bit controlling signal. Filter cutoff can be varied that way in the range of 8.5-13 kHz.

In an alternative embodiment, a switched capacitor filter is implemented in place of the continuous-time analog circuits to avoid contaminating the input with switching noise. Switched capacitor implementation for filters can provide for better time-constant accuracy and smaller area.

DC offsets of both the SPK and LFP channels have to be compensated. The LFP channel amplifies the input preamp offset (hundreds of μV's, typically) by up to 60 dB. Unless compensated, it would limit the dynamic range severely or even saturate the VGA. The SPK channel offset is determined by the offset of the ×10 stage amplified by 40 dB, as the DC part of the preamp output signal is cut off by the band splitter. Smaller than LFP, preamp offset is still significant. The ×10 stage has a larger input offset compared to the preamp, since the latter uses very large input devices because of the noise requirements.

Offset compensation is carried out by two calibration DAC's (one for LFP, one for SPK) applied to the last amplification stages (VGA's). The DAC's are implemented as 5-stage R2R resistor ladders, having 400 mV output swing. DAC values are stored in registers that can be individually accessed by the controller FSM through a common bus with five address/data bits and three control bits.

Figure 2:
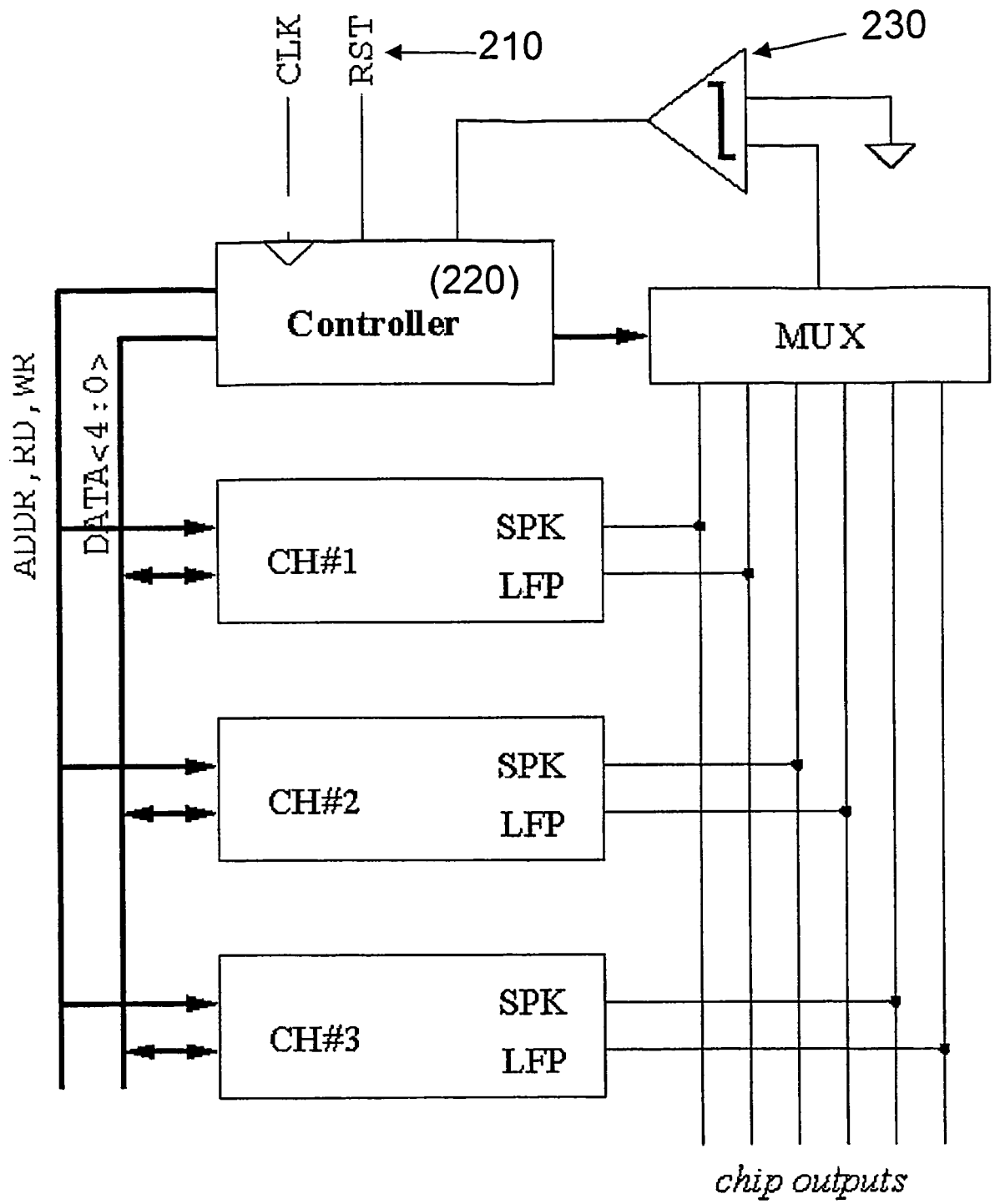
FIG. 2 is a schematic block diagram of a multi-channel integrated system, constructed in accordance with the principles of the present invention.

FIG. 2 is a schematic block diagram of a multichannel chip, constructed in accordance with the principles of the present invention. The controller 220 calibrates the outputs, one by one, upon de-assertion of the RST signal 210. Output offsets are compared to a reference level by means of the comparator 230.

Input Preamplifier

The input preamplifier preferably provides a sufficiently high input impedance in order not to overload the high-impedance recording electrode. The noise level requirement is dictated by the inherent noise of the recording electrode and cortical background noise, both of which have a magnitude of several μVs. In addition, the preamp preferably has a flat frequency response starting from DC and uses no switching circuits. A differential circuit addressing the above requirements is shown in FIG. 3.

Figure 3:
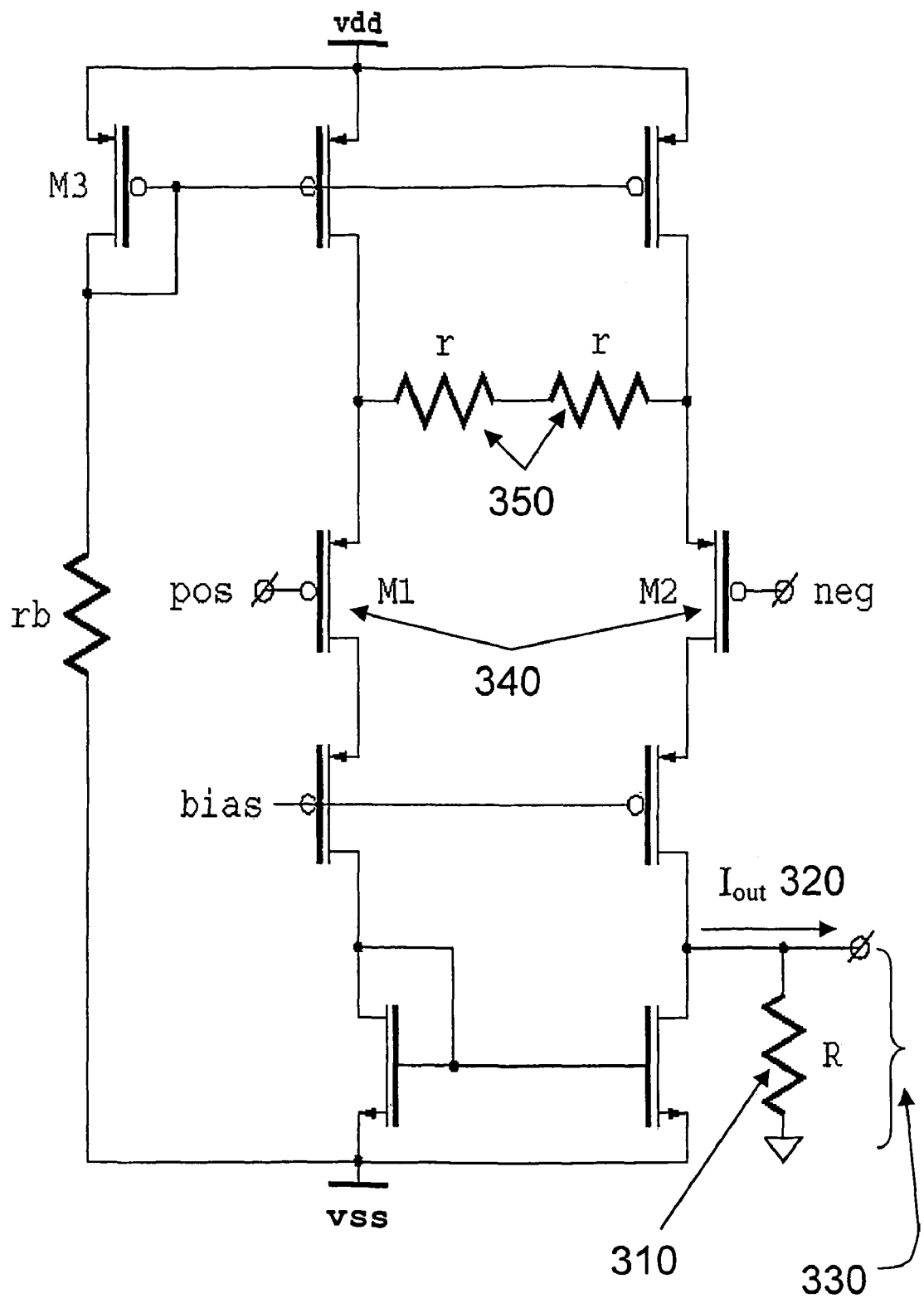
FIG. 3 is a schematic diagram of the input amplifier circuit topology, constructed in accordance with the principles of the present invention.

FIG. 3 is a schematic diagram of the input amplifier circuit topology, constructed in accordance with the principles of the present invention. This circuit is a degenerated differential cascaded transconductor stage, with a load resistor R 310 to convert the output current 320 back to a voltage 330. The disadvantage of this circuit is the gain error due to the finite transconductance of input transistors. The gain of the circuit in FIG. 3 is given by:

$$A = \frac{2R}{r + r_m} = \frac{2R/r}{1 + r_m/r}$$

where $r_m$ is the transresistance 340 of $M_{1,2}$ between MOSFETs M1 and M2. While r 350 can be matched to R 310 by using the same resistor types and employing appropriate layout techniques, there is no straightforward way of matching r 350 to $r_m$. The sensitivity to $r_m$ can be reduced by reducing the ratio $r_m/r$, but there is a limit on how high r 350 can be due to the noise requirements (some 10 kΩ) and reducing $r_m$ means more power. Instead, r 350 is matched to $r_m$ by appropriately controlling the bias currents through $M_{1,2}$ 340. $M_{1,2}$ 340 are operated in the sub-threshold region (the smallest $r_m$ for a given $I_d$), so that $r_m$ is inversely proportional to $I_d$:

$$r_m = \frac{\eta V_{th}}{I_d}, V_{th} = \frac{kT}{I_d}$$

$I_d$ is given by:

$$I_d = \frac{V_{dd} - V_{gs3}}{r_b}$$

thus the gain can be written as:

$$A = \frac{2R}{r + r_b \frac{\eta V_{th}}{(V_{dd} - V_{gs3})}}$$

One matches $r_b$ to r 350 and keeps $V_{gs3}$ much lower than $V_{dd}$. Since the ratio of $V_{th}$ and $V_{dd}$ is small, the above expression becomes weakly dependent on process parameter $\eta$ and on $V_{gs3}$. The chip is expected to work in constant temperatures (subject body), thus the dependence on $V_{th}$ is not problematic. Standard deviation of chip-to-chip channel gain variation of less than 2% was actually measured.

Measurement Results

FIG. 4 is a table summarizing electrical test results. The chip was fabricated using an AMS 0.35 µm quad-metal, double poly CMOS process with 3.3 V power supply. Ten fabricated chips were tested electrically. Some of the electrical test results are summarized in Table I of FIG. 4. A column of parameters 410 is given with a corresponding column of values 420. While most of the design goals were met, note that band splitter frequency is somewhat displaced. This is due to a failure in the band-splitter MOS capacitor biasing circuit.

Figure 5A:
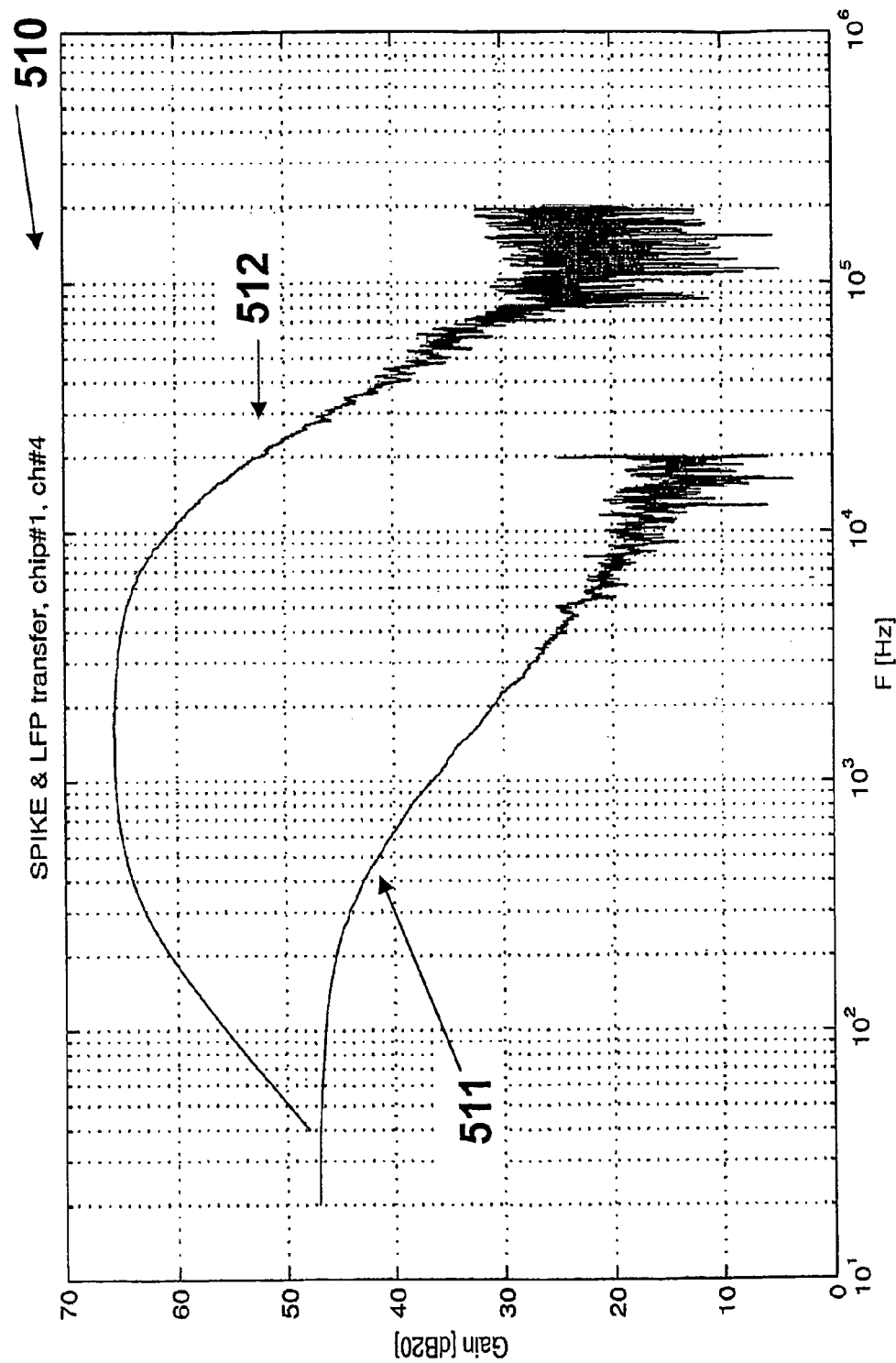
FIGS. 5a and 5b are a measured channel frequency response and an input-referred noise PSD, respectively.
Figure 5B:
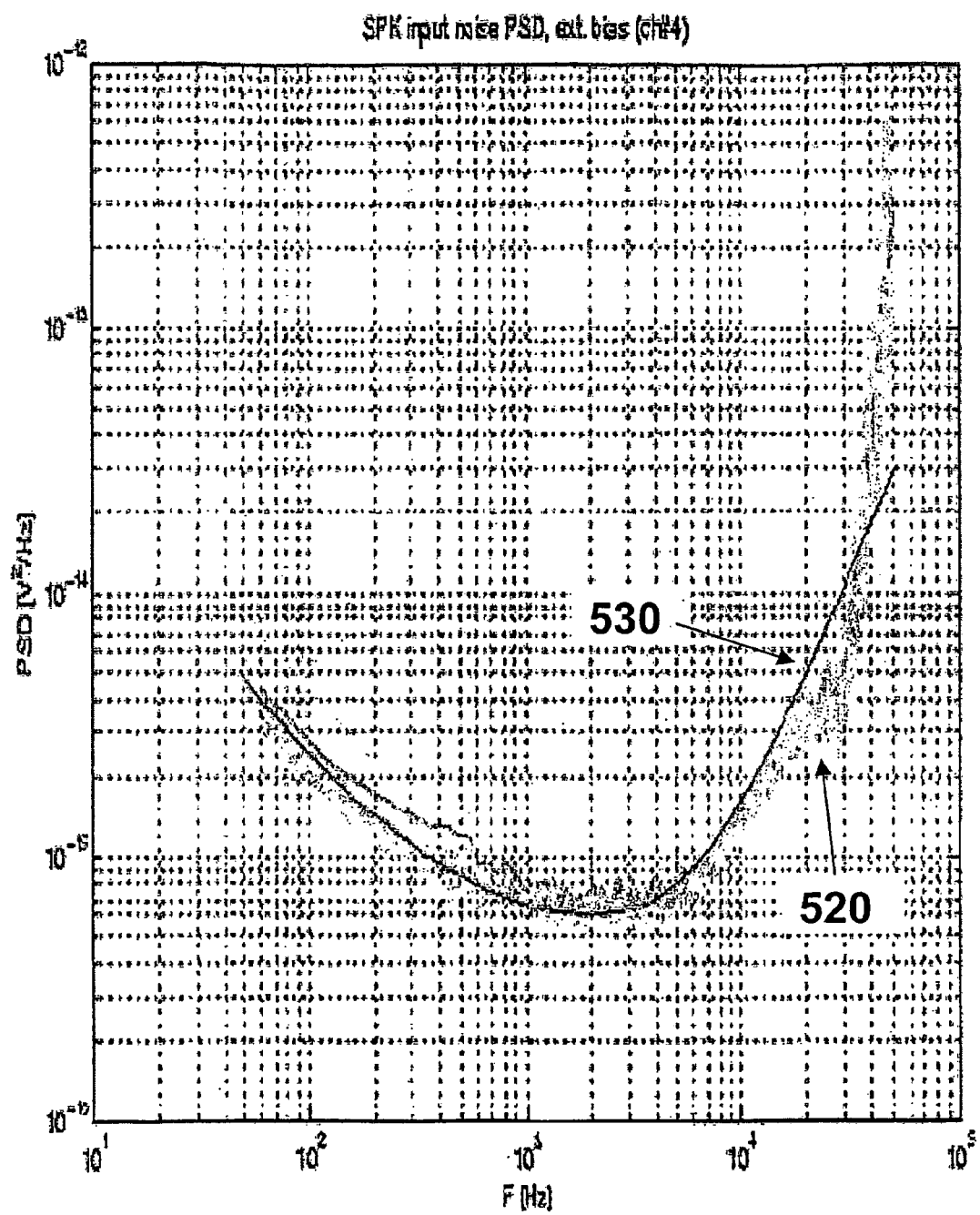

FIGS. 5a and 5b are a measured channel frequency response 510 and an input-referred noise power spectral density (PSD) 520, respectively. The black line 530 is a simulated PSD. The measured magnitude of frequency response (magnitude) for SPK 512 and LFP bands 511 is shown in FIG. 5a. The frequency response is quite stable over all the measured chips. FIG. 5b shows input-referred noise PSD of several channels together with a simulated curve (solid line). 1/f noise dominates over the LFP band and thermal noise dominates over the higher frequency SPK band. The increase at the high end is due to out of band components (i.e. above the output LPF cutoff). Power dissipation of 3 mW per channel was measured.

For the analog front-end device described thus far, a low noise, dual band; twelve channel differential front-end IC for neuronal recording has been implemented in 0.35 µm CMOS technology. The measured signal is separated into LFP (low frequency local field potential) and SPK (high frequency firing activity) bands, spanning 2-200 Hz and 200 Hz-10 kHz, respectively. A digitally calibrated offset applies compensation at both channels and $2^{nd}$ and $3^{rd}$ stage amplification enable 60 dB and 80 dB gains, respectively.

Measurements demonstrate that gain and noise requirements were met. Power consumption was measured at about 3 mW per channel.

Power dissipation can be reduced by employing active filters (such as gm/C) and by proper scaling of the later amplification stages to operate on lower currents, as the noise requirements on those stages are relaxed.

Figure 6:
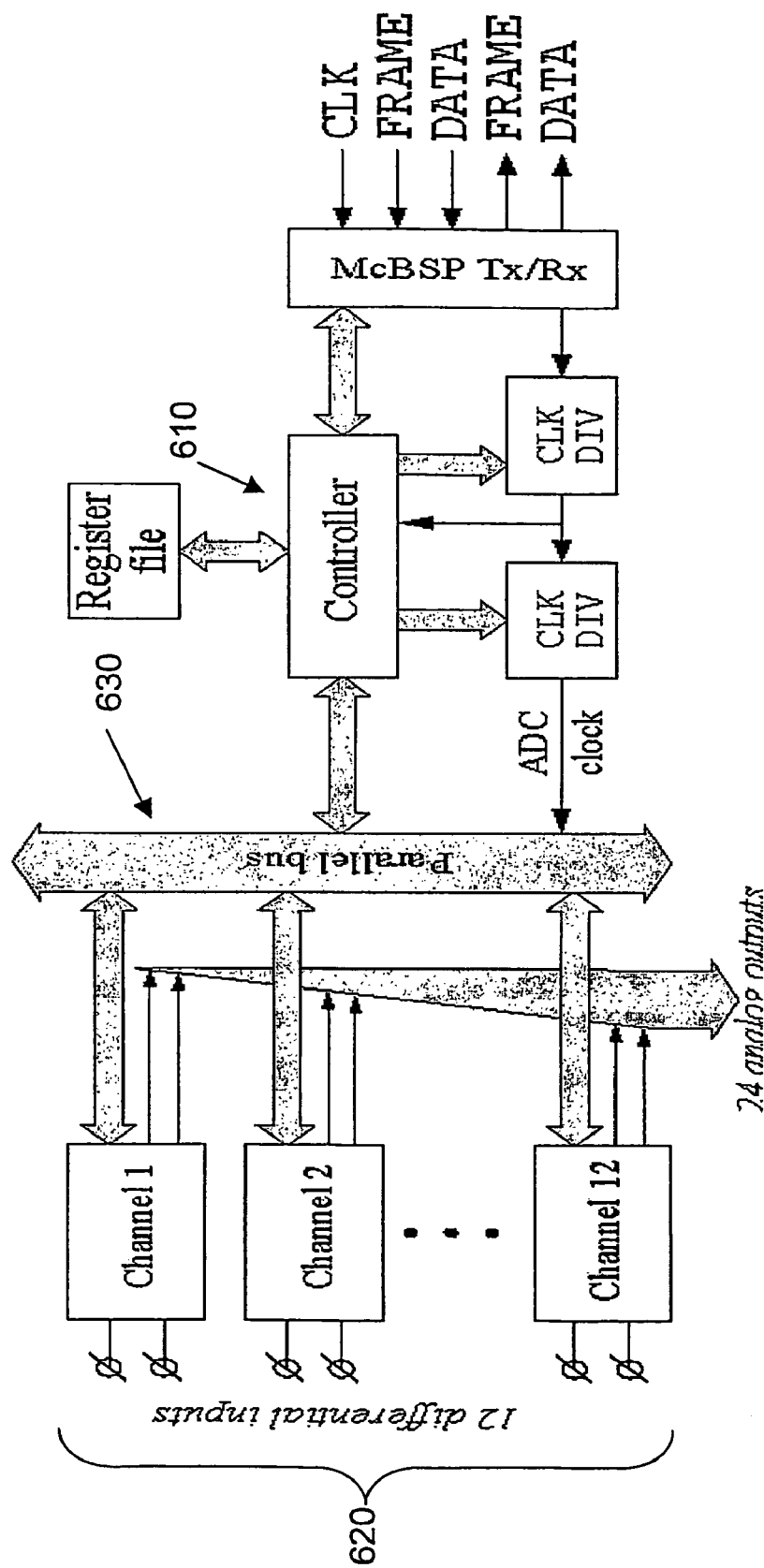
FIG. 6 is a schematic block diagram of the chip architecture for a mixed-signal front-end processor for multi-channel neuronal recording, constructed in accordance with the principles of the present invention.

FIG. 6 is a schematic block diagram of the chip architecture for a mixed-signal front-end processor for multi-channel neuronal recording, constructed in accordance with the principles of the present invention. The on-chip controller 610 is responsible for host communication, chip timing, internal register access, channel readout and spike detection. Channel registers 620 and A/D converters are accessed through an internal parallel bus 630, mastered by controller 610.

Controller 610 has two modes of operation: programming and streaming. In the programming mode, contents of internal registers can be stored and fetched by the host. In the streaming mode, controller 610 continuously polls the channel ADC's, checks for threshold crossing events on every channel and transmits the active signal segments to the host. All twelve channels, or an arbitrary subset thereof, can be enabled for data streaming.

A threshold crossing event is triggered for a certain channel when the output of this channel falls below the low threshold or rises above the high threshold. A certain number of samples from that channel will be communicated to the host following the threshold crossing event. The threshold values and the number of samples to transmit after a threshold event are programmable. The entire data stream, without clipping, can be obtained from the chip by setting the thresholds identically.

Chip Communications

The chip communicates over a McBSP bus. This is a five-wire, full-duplex, bit-serial synchronous bus. A synchronization clock signal is constantly supplied by the host. The communication is carried out in frames. The host sends 24-bit frames (one refers to this direction as downwards) and the chip replies with 16 bit frames (the upwards direction). The lengths of downward and upward frames were conveniently chosen to match the lengths of a single host instruction packet and a single reply packet respectively.

The maximal data rate that is generated by the chip can be calculated as follows: A channel A/D sample is ten bit wide (although seven bits are sufficient, ten bit ADC's are implemented for verification purposes). Together with a four bit channel number and a two bit control field, an A/D sample can be communicated in a single 16 bit frame. Sampled at 40 Ksps, a single channel would generate a 640 Kbps. Although there are only twelve channels in the current version of the chip, the bus interface was designed to support sixteen channels for future versions. The aggregate data rate is therefore 10.24 Mbps. The bus was set to operate on a slightly higher, 12.5 MHz clock signal.

Instruction Set and Register Access

The chip operation is controlled through instructions sent via the McBSP bus. Four instructions are available:
    STORE reg val: Store value in a register;
    FETCH reg: Fetch register contents;
    RUN: Start streaming data; and
    STOP: Halt streaming data.

Two sets of parameters control the chip: those affecting controller operation and those affecting the channels. The former include clock divider settings, threshold values, number of samples to communicate upon threshold detection and channel enabling bit mask. The registers for their storage reside in the controller and are accessed directly. The latter include offset calibration data, channel gains and filter frequencies. The registers are distributed over the channels and are accessed through the internal bus.

In an alternative embodiment each individual channel has an associated set of threshold values.

In yet another alternative embodiment, each channel contains a FIFO memory, and following a threshold detection, the channel produces a predetermined number of samples that were stored prior to the threshold detection, and the channel additionally produces another predetermined number of samples that were stored after the threshold detection.

The internal bus has eight data lines, two control lines and a clock. A register connected to the bus is identified by a distinct eight-bit address. Every bus access is carried out in two steps; during the address step (ADDR is high) the address is driven on DTA<7:0>. The register matching this address is selected. During the data step (ADDR is low) the contents of the selected register are driven on the bus by the channel (WR is low) or the register is updated with the value on the bus (WR is high). The bus can be accessed in three possible scenarios, SELECT-READ, SELECT-WRITE and SELECT-READ-MODIFY-WRITE.

Figure 7:
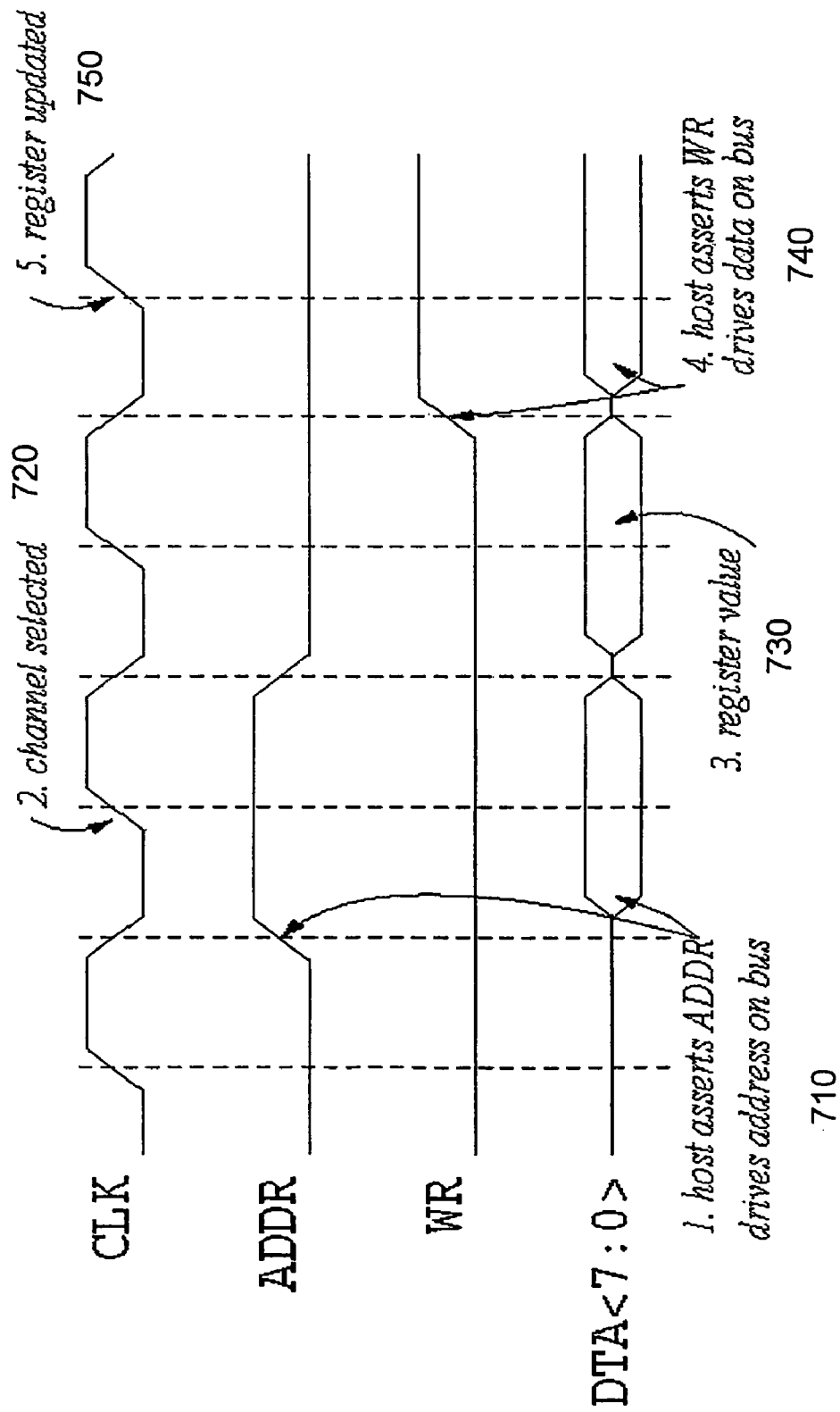
FIG. 7 shows the bus signals during the last access scenario: SELECT-READ-MODIFY-WRITE, constructed in accordance with the principles of the present invention.

FIG. 7 shows the bus signals during the last access scenario: SELECT-READ-MODIFY-WRITE, constructed in accordance with the principles of the present invention:
host asserts ADDR drives address on the bus 710;
channel selected 720;
register value driven on bus 730;
host asserts WRITE drives data on bus 740; and
register updated 750.

A ten-bit A/D sample is read with two register accesses, SELECT-READ and SELECT-READ-MODIFY-WRITE, since the registers are fixed eight-bit width while the A/D sample is ten bit long. The write access is needed to request the next conversion at the channel A/D. Reading a single A/D sample out of a channel therefore takes five clock cycles:

To sample 16 channels at 40 Ksps, a bus clock rate of at least 3.2 MHz is needed. Since the bus clock is derived form the McBSP clock by integer division, the most suitable division factor is 3, setting the bus clock to about 4.16 MHz.

Host Interface

Figure 8:
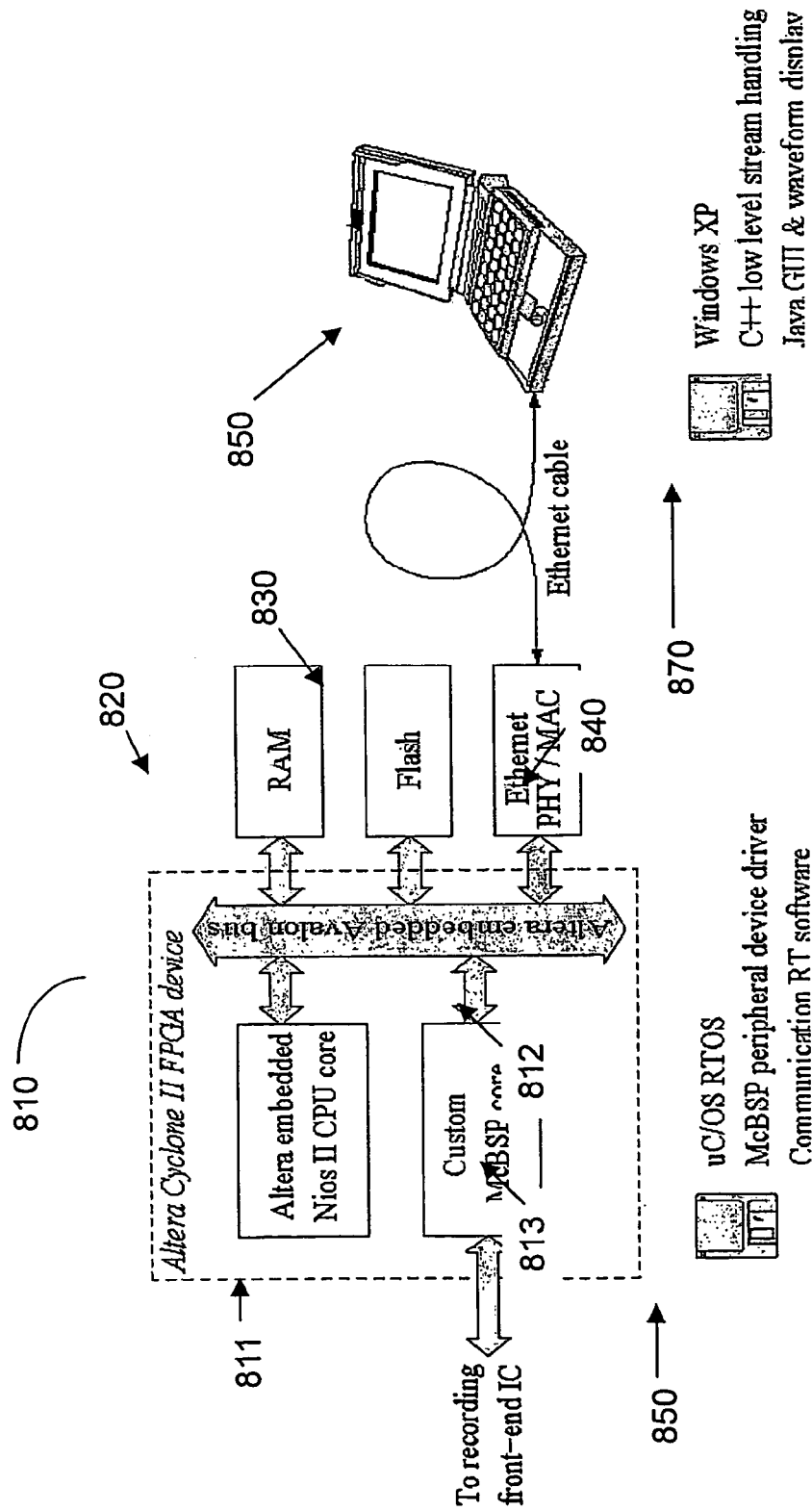
FIG. 8 is a schematic illustration of a host interface, constructed in accordance with the principles of the present invention.

FIG. 8 is a schematic illustration of a host interface, constructed in accordance with the principles of the present invention. A special interface provides for communication between a personal computer and the neuronal recording front-end. The basis of the interface is an Altera Nios II development kit board incorporating an Altera Cyclone II FPGA device 810, RAM 820 and flash memory 830 and an integrated Ethernet physical interface/MAC 840.

FPGA device 810 incorporates an Altera Nios II embedded processor core 811, bus logic 812 and a custom-developed peripheral 813 for McBSP communications with the neuronal recording front-end. Embedded processor 811 executes the μC/OS real-time operating system (RTOS) and custom-developed real-time software 850 for handling the neuronal data stream. The software reads the serial McBSP data, packetizes it and transmits the packets over Ethernet to a host computer 860 using UDP/IP protocol. It also handles the incoming instructions from host 860 and communicates them to the chip.

The host side software consists of a low-level C++ module 870 that handles the data stream in real time, dumps it onto the disk and performs the decimation necessary for an on-screen display.

Figure 9:
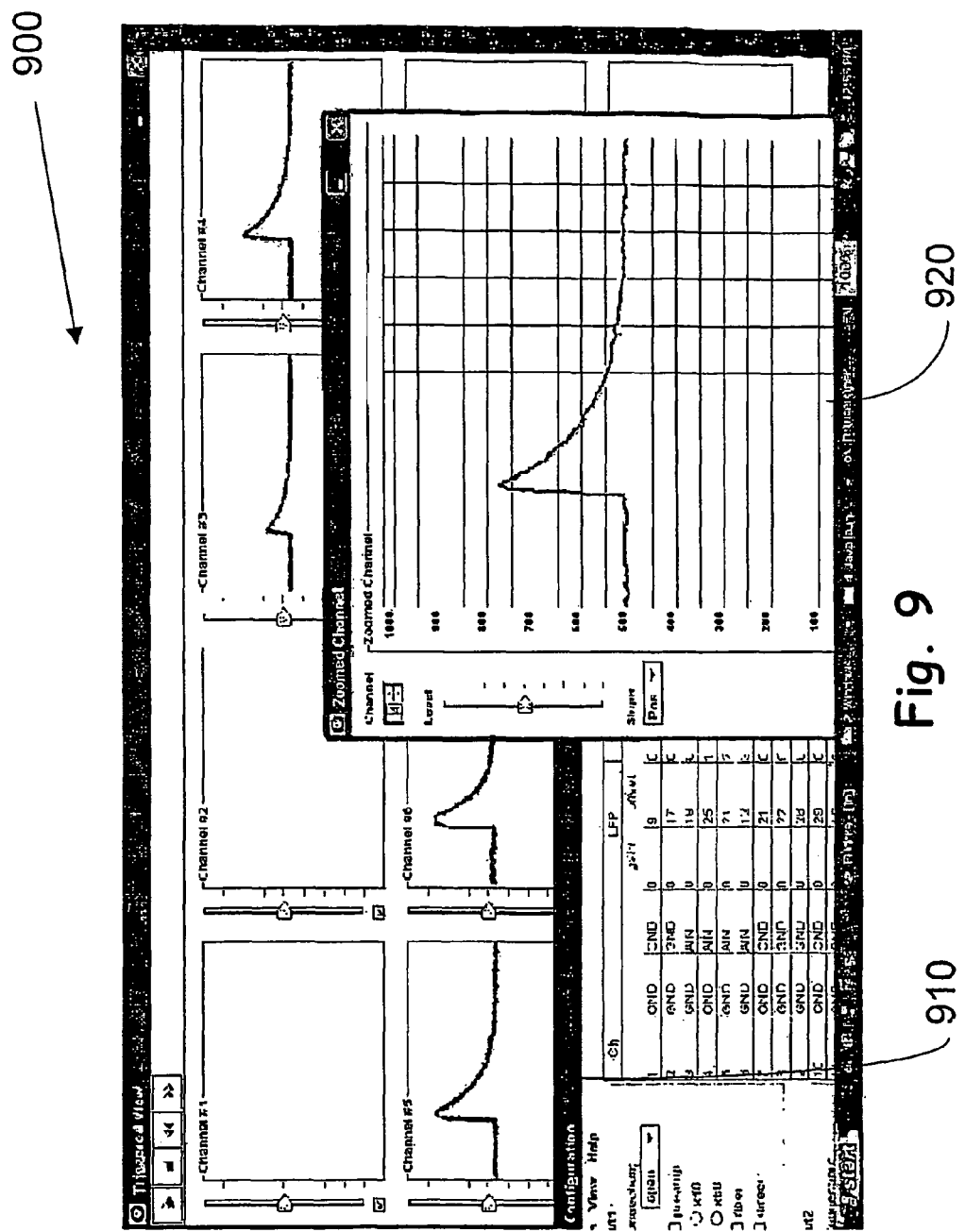
FIG. 9 is an exemplary screenshot on the host computer of FIG. 8.

FIG. 9 is an exemplary screenshot 900 on the host computer of FIG. 8. Displaying data on screen without some sort of decimation (i.e. downsampling) would result in screen refresh rates that are too high, and therefore imperceptible to the human eye. Data display and system control are preferably performed by a top level Java GUI module. A series shows a variety of spikes, one of which is a spike 910, magnified and shown "zoomed" at 920.

Recording Channel

Figure 10:
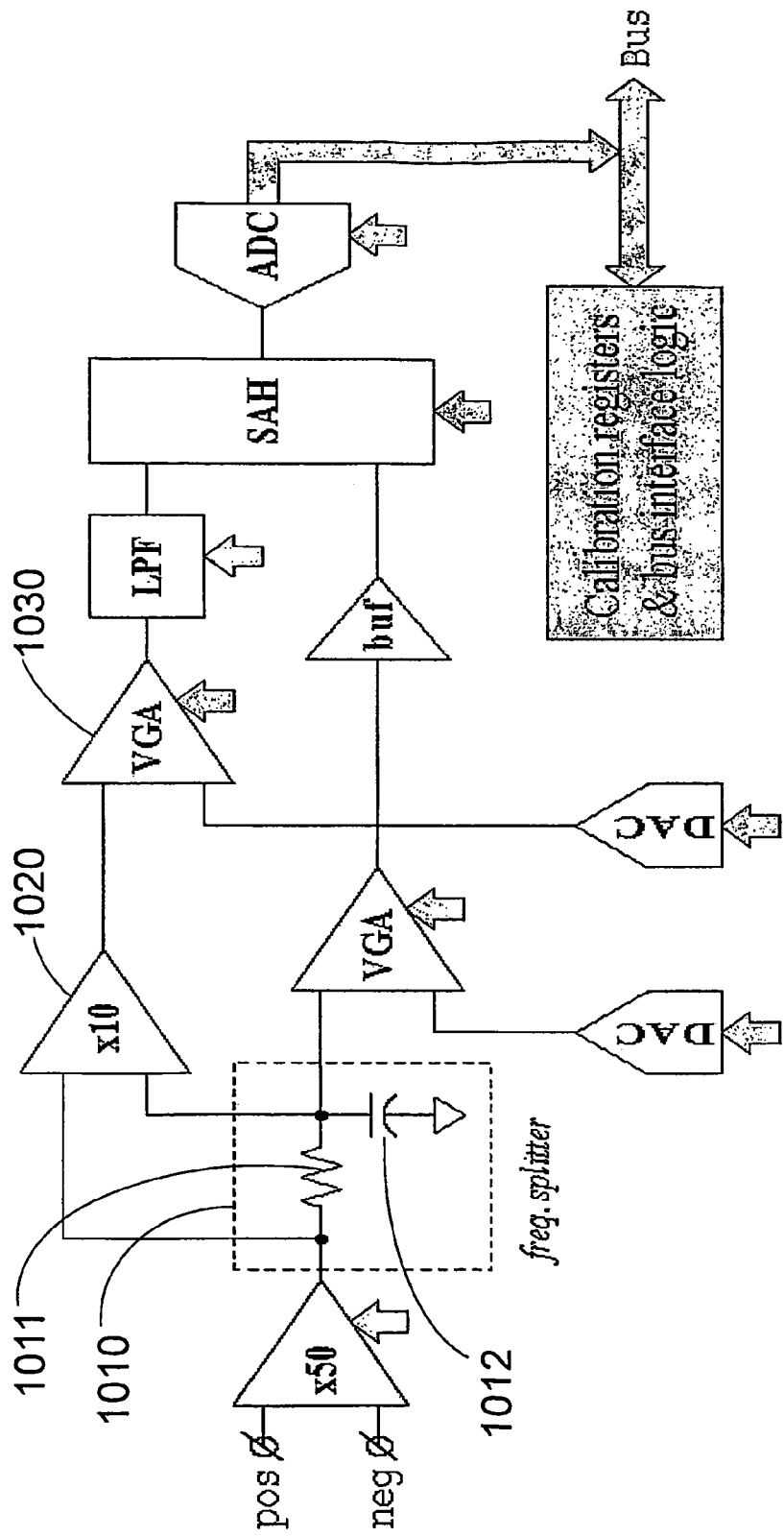
FIG. 10 is a schematic illustration of the recording channel, as implemented on a 0.35 μm CMOS chip.

FIG. 10 is a schematic illustration of the recording channel, as an embodiment alternative to that of FIG. 1, and as implemented on a 0.35 μm CMOS chip. The input signal is amplified fifty times by the first stage, which also converts the differential signal to a single-ended signal. A first-order RC filter 1010 splits the signal into high frequency SPK and low frequency LFP parts. The splitting pole is roughly placed at 200 Hz, with a 5 MΩ resistor 1011 (high resistive polysilicon) and 160 pF (gate-oxide) capacitor 1012. The SPK signal is amplified by an intermediate ×10 stage 1020 and a variable gain amplifier (VGA) 1030 with digitally selectable gain of 2.5, 5, 7.5 or 10. The SPK chain maximal gain is therefore 5,000.

Figures 11A, 11B:
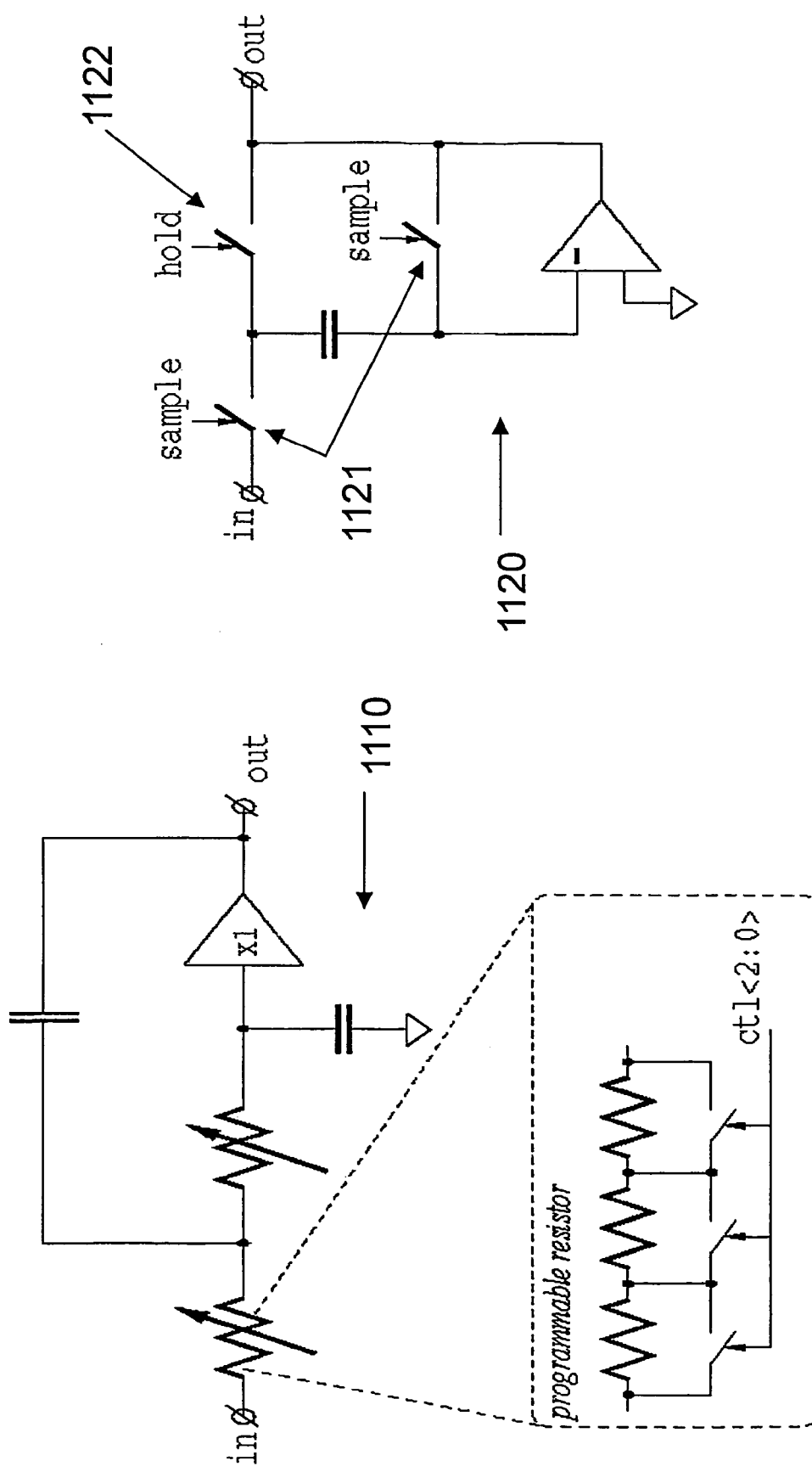
FIG. 11a is a schematic illustration of a 2nd order Sallen-Key biquad circuit.
FIG. 11b is a schematic illustration of a Miller capacitance sample-and-hold circuit.

FIG. 11a is a schematic illustration of a 2nd order Sallen-Key biquad circuit 1110. SPK signal band is limited by a second-order Bessel LPF implemented as a Sallen-Key biquad. The −3 dB frequency is digitally programmable in the range of 8-13 kHz, by means of a multi-tap resistor. The LFP signal is amplified by an identical VGA, without the intermediate ×10 amplifier. The LFP chain maximal gain is 500.

Both SPK and LFP channels have to be compensated for DC offsets introduced by element mismatch. The LFP channel amplifies the preamp input offset (typically hundreds of μV) by 54 dB. Unless compensated, it would severely degrade the LFP dynamic range or even saturate the VGA. The SPK channel amplifies the offset of the intermediate ×10 stage by 40 dB, as the preamp DC is blocked by the splitter. Though smaller than LFP, SPK offset is still significant. The ×10 stage has a larger input offset compared to the preamp, as the latter uses very large input devices (due to noise requirements). DC offset compensation is carried out by adjusting the VGA reference voltages with a pair of 5-bit calibration DAC's.

FIG. 11b is a schematic illustration of a Miller capacitance sample-and-hold circuit 1120. The channels are multiplexed by Miller-capacitance sample 1121 and hold 1122 circuit and converted by a 10 bit successive approximation ADC, which incorporates a special, low-power inverted-ladder DAC.

Input Preamp

Voltage offsets inherent in neural signal recordings constitute a major challenge in preamplifier design. An input signal preferably is high-pass filtered at frequencies as low as several Hertz, to let the LFP signal pass unsuppressed. Such time constants are not readily available in integrated circuits.

Several approaches for DC offset stabilization are known in the art. Off-chip elements are sometimes employed at input stages. Several fully integrated approaches have also been demonstrated: The signal can be capacitively coupled to the amplifier using the polarization capacitance of the electrode or it can be shunted either by a weak-inversion MOS transistor or a reverse-biased diode. Both approaches deliver a large "small-signal impedance" to form a low frequency pole at the input. In the former, the gate bias of the shunting transistor is derived with a laser-trimmed resistor. The DC gain of this scheme is not strictly zero, since the real part of the electrode impedance, although very large, is not infinite. DC gain is therefore defined by the ratio of the shunting resistance and the parallel resistance of the electrode. Another fully integrated approach suggests using a pseudo-resistor device based on a weak inversion MOS and a parasitic bipolar. Such a device has an extremely large small signal resistance at small bias voltages.

Figure 12:
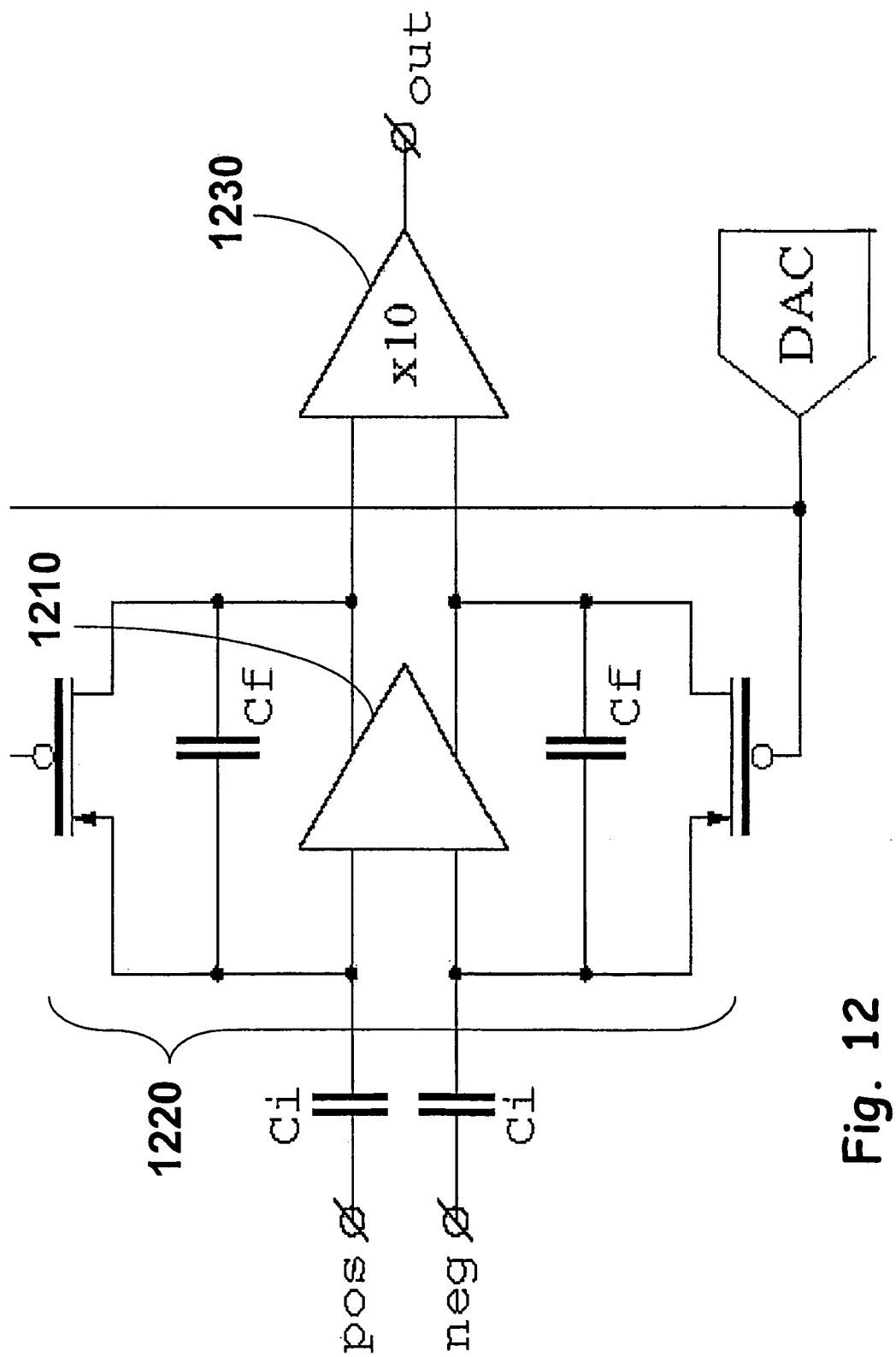
FIG. 12 is a schematic illustration of the preamp circuit, built in accordance with the principles of the present invention.

FIG. 12 is a schematic illustration of the preamp circuit, built in accordance with the principles of the present invention. A differential stage 1210 with a gain of five and an HPF filter 1220 is followed by a differential-to-single-ended stage 1230 with a gain of ten. The total preamp gain is therefore 50.

The minimal gain to be provided by the preamp is determined by noise constraints as follows. RMS noise introduced by the frequency splitter resistance into the SPK signal (band of 10 kHz) is:

$$\sqrt{4kTR \cdot 10^4} = 28 \, \mu V$$

Hence, the preamp preferably provides a gain well above 20 dB to keep the splitter contribution below the target 2 µV.

Figure 13A:
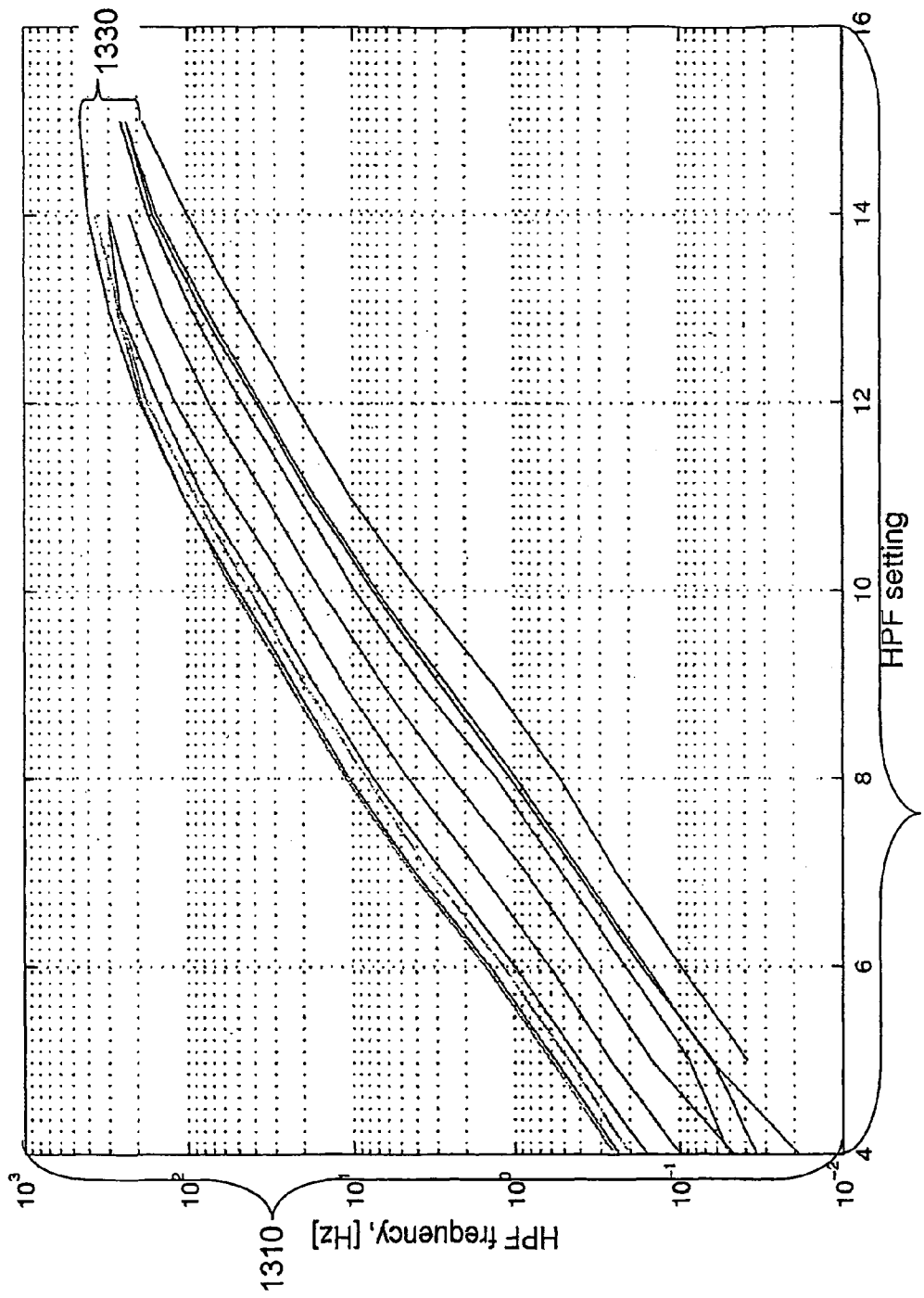
FIG. 13a is a graph of Input HPF cutoff vs. DAC setting, for several channels.

A weak inversion MOS transistor is placed in parallel with Cf to provide a first order high-pass filter for input DC suppression. The cutoff frequency is digitally programmable through gate bias voltage adjustment with a calibration DAC. As the conductance provided by the feedback transistor does not belong to a set of controlled process parameters, a significant variability was measured (more than an order of magnitude) in cutoff frequency among the channels, even on the same fabrication die, as shown in FIG. 13a below. Being able to control the gate bias voltage, all channels could be calibrated to a 1 Hz cutoff.

Figure 13B:
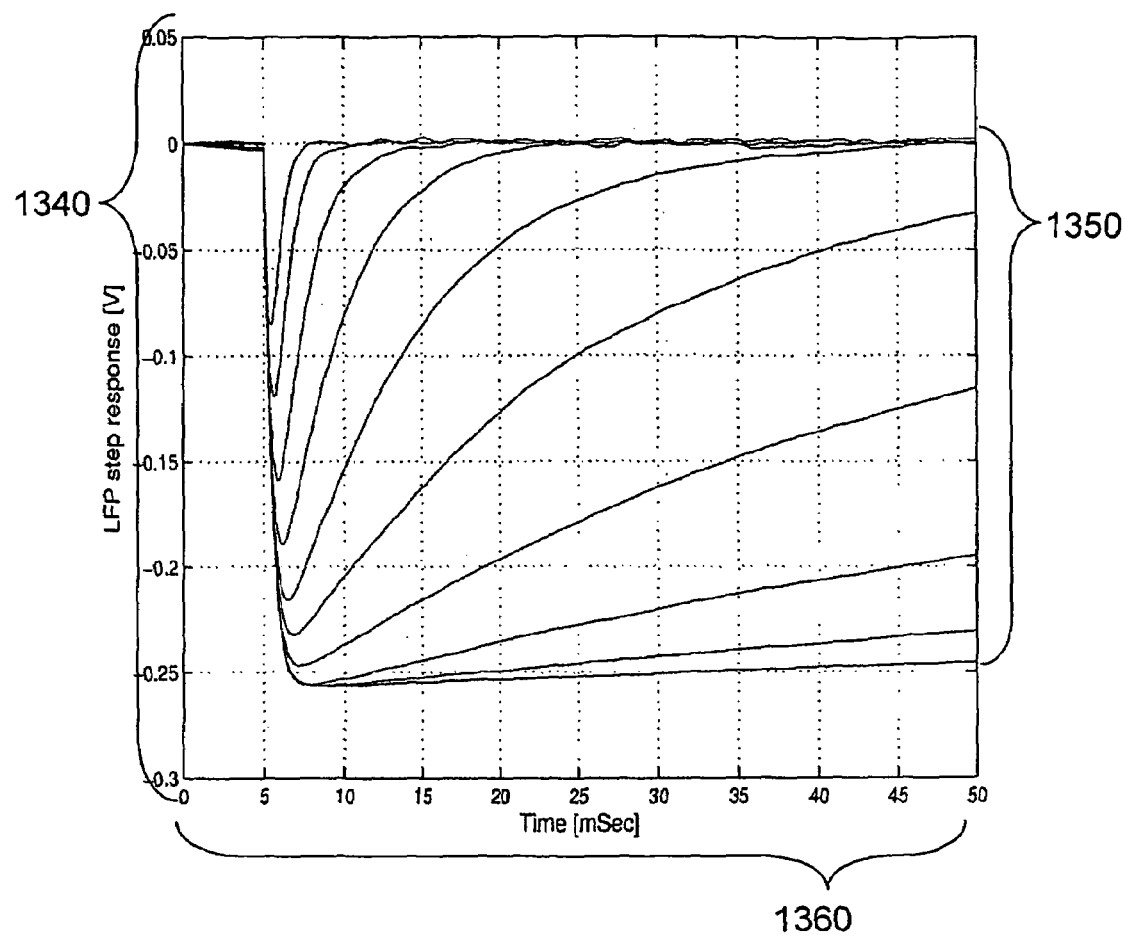
FIG. 13b is a graph of LFP step response for several DAC setting in the time domain.

FIG. 13a is a graph of input HPF cutoff 1310 vs. DAC setting 1320, for several channels 1330. FIG. 13b is a graph of LFP step response 1340 for several DAC settings 1350 in the time domain 1360. Given a single pole splitter with pole frequency $f_1$, the noise energy contributed by the feedback resistor to the SPK signal is:

$$\int_0^\infty \frac{4kTg}{\omega^2 C_f^2 + g^2} \times \frac{\omega^2}{\omega^2 + \omega_1^2} d\omega$$

Assuming $f_1$ (about 200 Hz) is much larger than the selected cutoff frequency $f_0 = g/2\pi C_f$ of the input HPF, the expression above can be re-written as:

$$\frac{kT}{C_f} \times \frac{\omega_0}{\omega_1}$$

and reflected to the input as:

$$\frac{kT}{C_f} \times \frac{\omega_0}{\omega_1} \times \frac{C_f^2}{C_i^2}$$

Placing the resistive element in the feedback has an important advantage: the noise generated by the resistor is attenuated by the amplifier gain. For $f_0$ of 1 Hz, $f_1$ of 200 Hz, first stage gain of five and $C_f$ of 500 fF, one obtains about 1.8 µV input RMS noise (remembering that there are two resistive elements in a differential stage). The calculations do not include the op-amp noise.

Another important tradeoff is revealed by the above formula: higher $f_0$ yields higher noise contribution of the pseudo-resistors and better DC rejection. In that context, providing for a selectable cutoff frequency is another advantage.

Measurement Results

Figure 14:
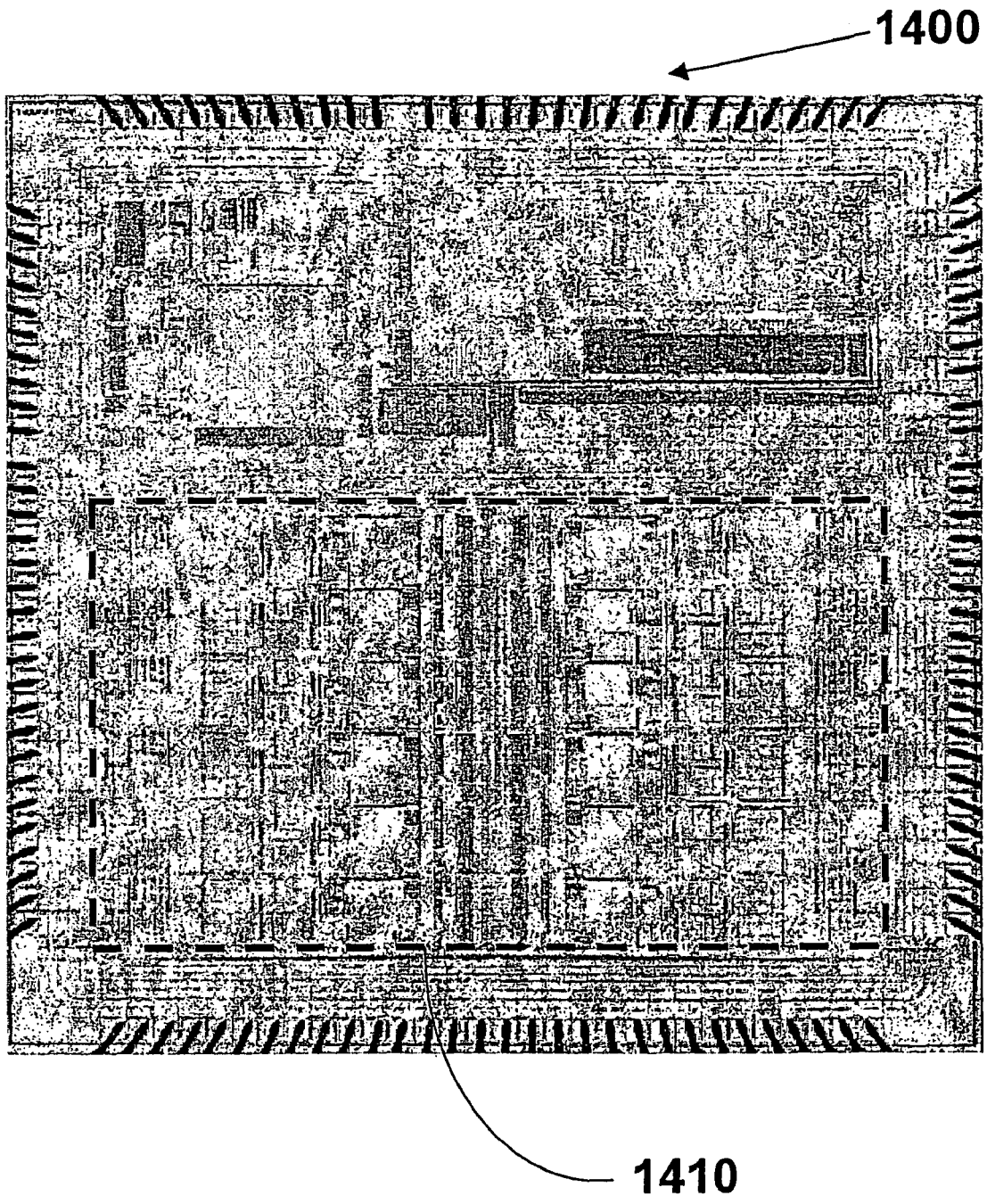
FIG. 14 is a micrograph of the fabrication die used for the circuits of FIGS. 10, 11a, 11b and 12.

FIG. 14 is a micrograph of the fabrication die used for the circuits of FIGS. 10, 11a, 11b and 12. A 0.35 µm CMOS double poly, quad metal IC 1400 was fabricated at Austrian MicroSystems and tested electrically. The electrical tests were carried out on twelve channels 1410 from ten different dies. The measurements were completely automated. The instruments and the chip were controlled by MATLAB software.

Figure 15A:
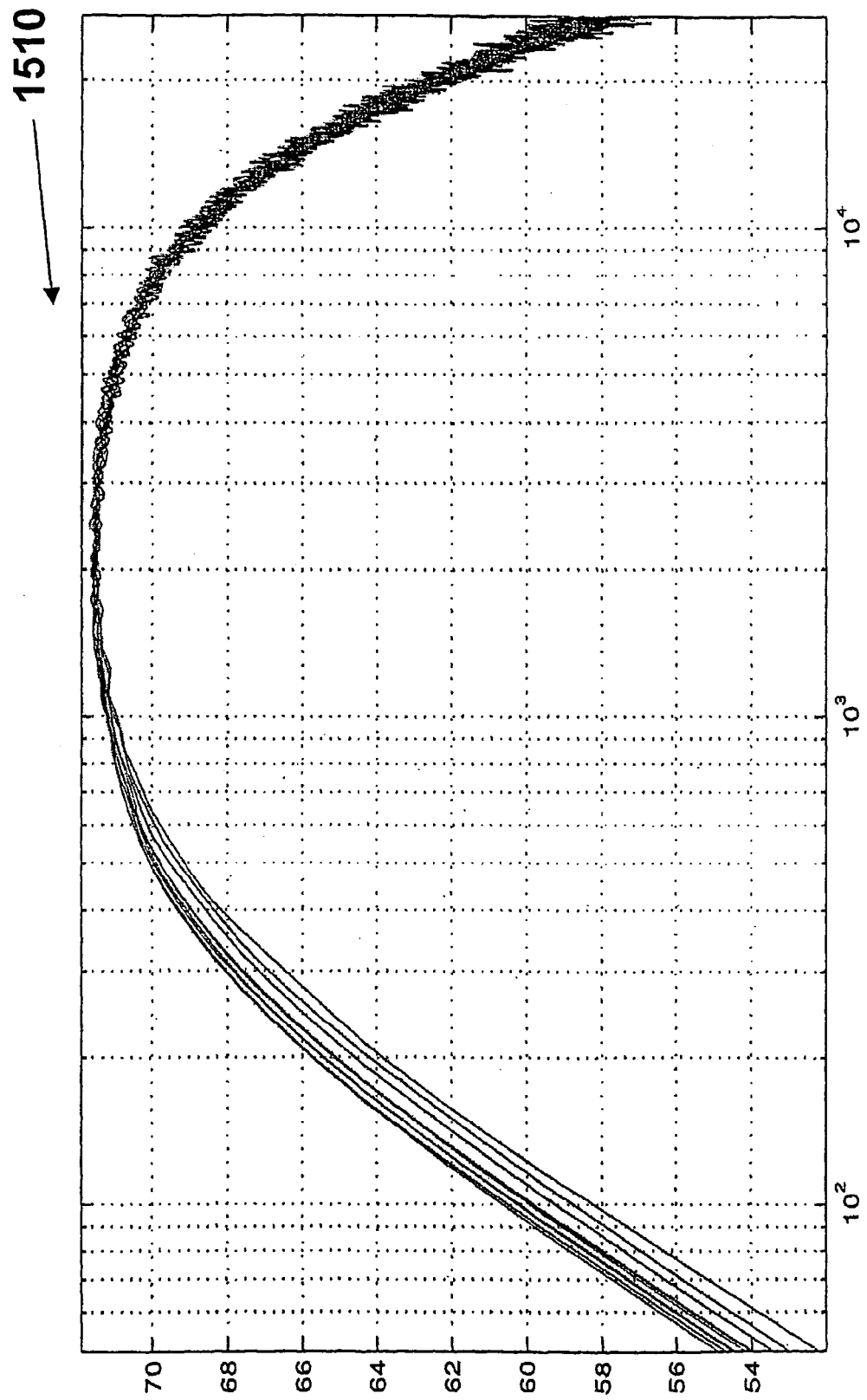
FIGS. 15a and 15b are graphs of small signal responses of the SPK and the LFP channels, respectively.
Figure 15B:
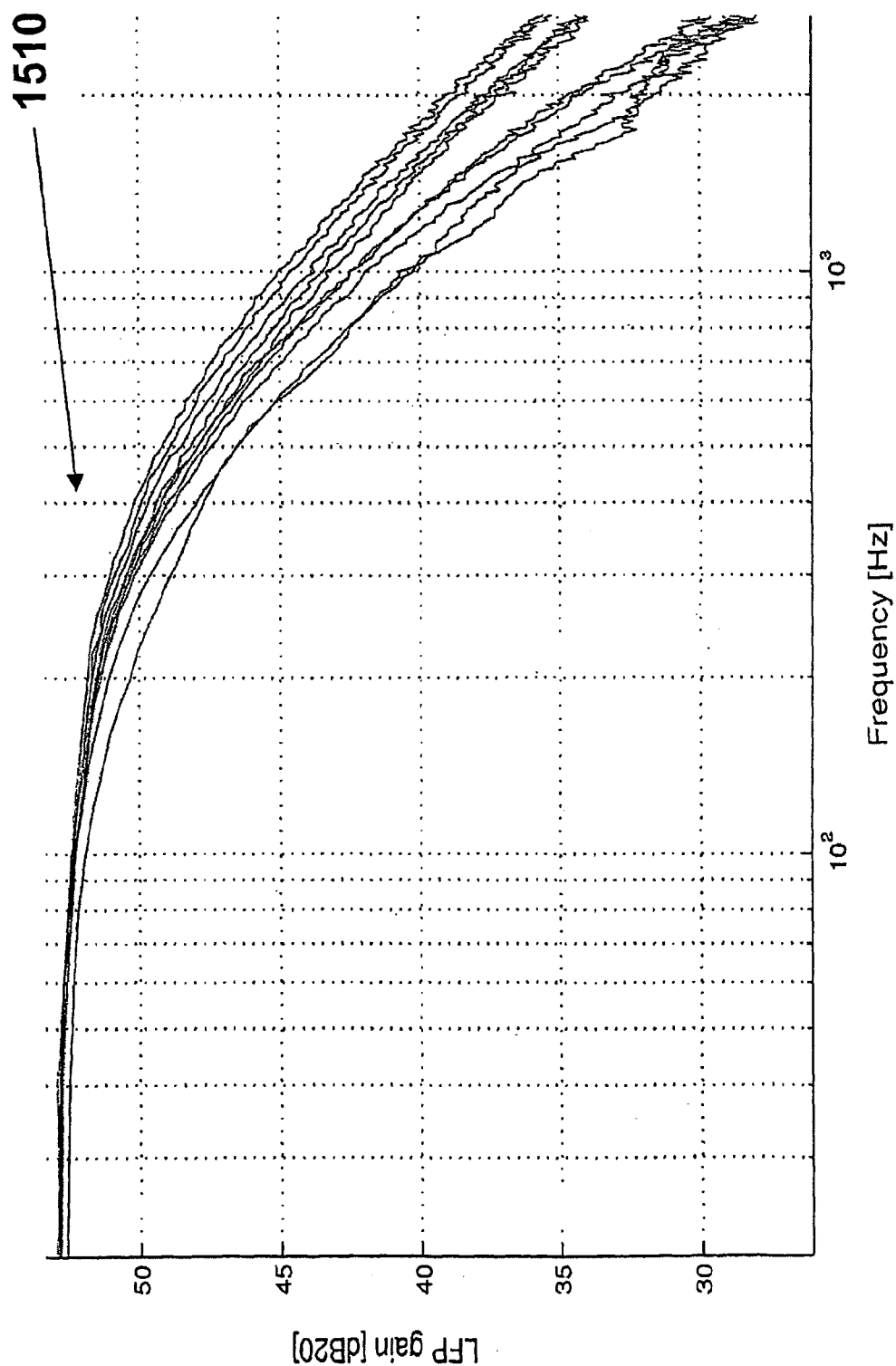

FIGS. 15a and 15b are graphs of small signal responses of the SPK channel 1510 and the LFP channel 1520, respectively. The flat band gains for the SPK and LFP chains were measured as 3780 and 430, respectively. They have small variations over different dies, some 1% for SPK and 2% for LFP. The deviation from the target average values is due to an inaccurately predicted gain of the x×10 stages (and VGA's, which have similar configurations), which turned out to be 9.1 instead of 10. Thus gain errors of $0.91^3$ and $0.91^2$ are introduced into SPK and LFP chains, respectively.

It can be observed, both on SPK and LFP graphs, that the frequency splitter pole varies significantly between different curves. Its average location is also displaced, 350 Hz instead of 200 Hz. This is due to a failure in a bias circuit that was supposed to provide well bias for a large MOS capacitor inside the band splitter.

Noise measurements were carried out with grounded inputs.

Figure 16A:
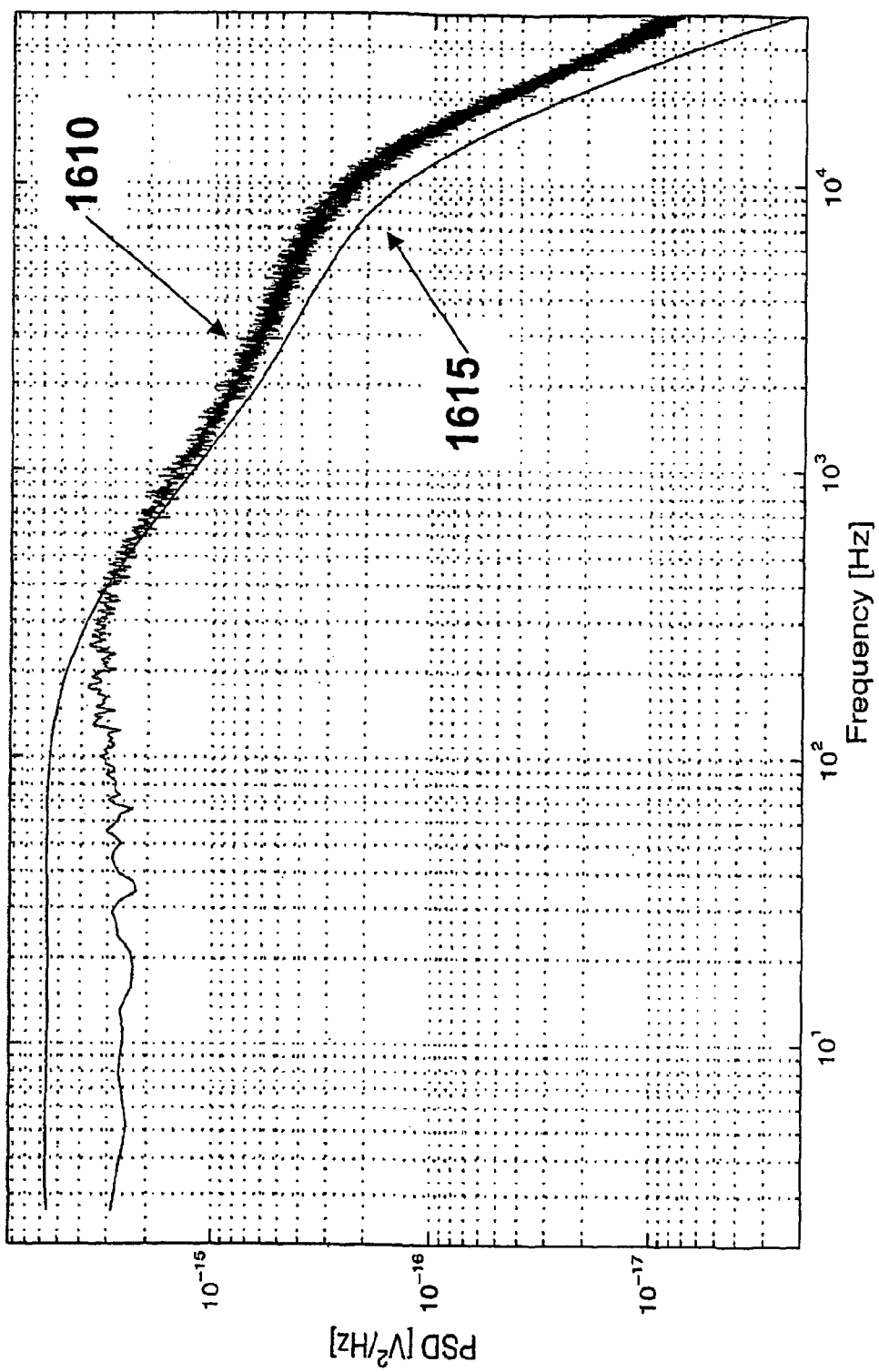
FIGS. 16a and 16b are exemplary graphs of input-referred noise power spectra in the SPK channel and the LFP channel, respectively, along with simulated SPK curve and simulated LFP curve.
Figure 16B:
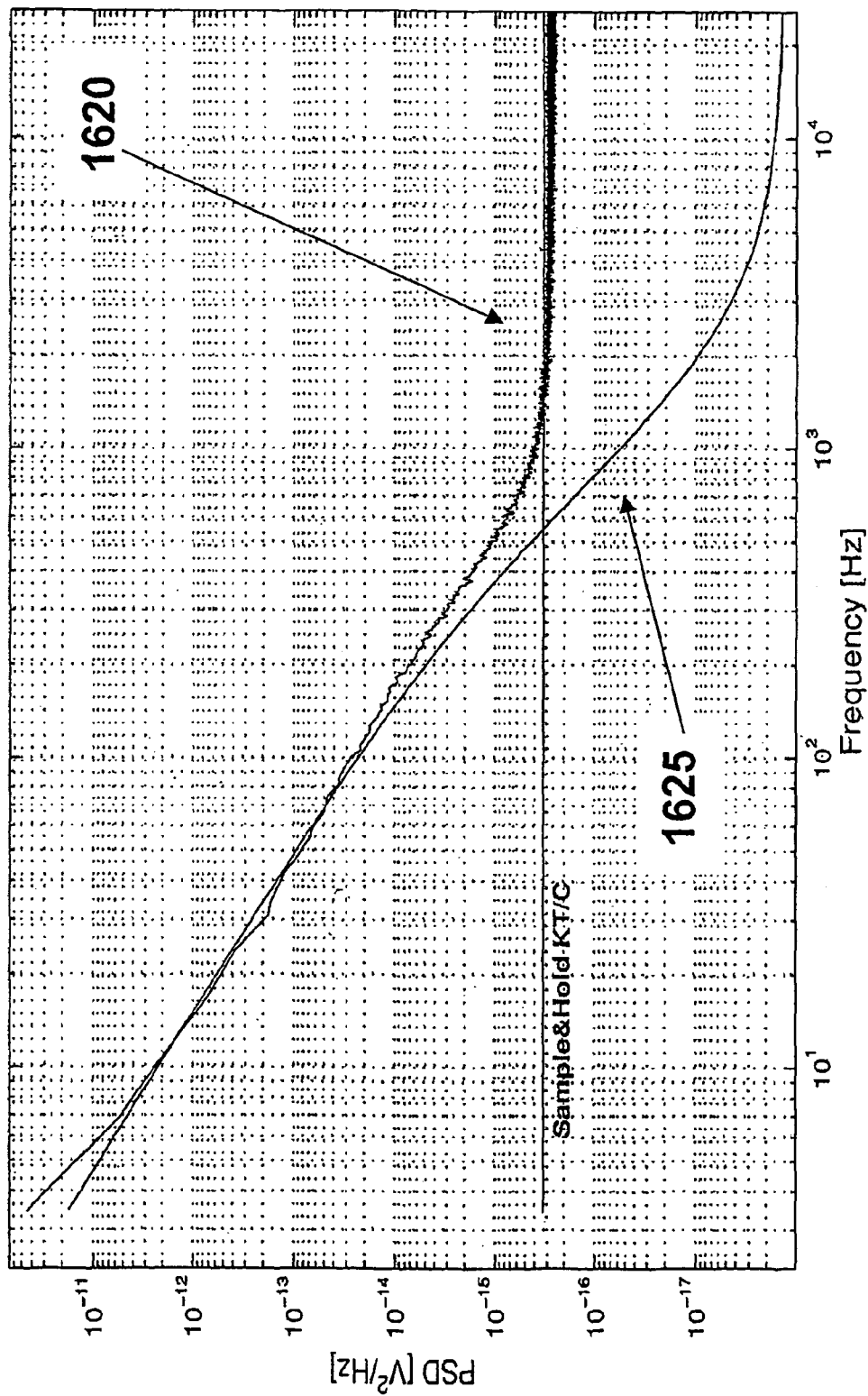

FIGS. 16a and 16b are exemplary graphs of input-referred noise power spectra in the SPK channel 1610 and the LFP channel 1620, respectively, along with simulated SPK curve 1615 and simulated LFP curve 1625. The total input-referred noise is 3 µV for SPK chain and 10 µV for LFP chain, when measured down to frequency of 10 Hz. The low-frequency behavior of the LFP noise is $1/f^2$, and not $1/f$ as might be expected. This is due to leakage currents through the pseudo-resist or MOS diffusions in the input stage. The areas of these diffusions are preferably kept small in the layout. The input stage of the preamplifier consumes 75 µA. The corresponding Noise Exposure Forecast (NEF) is given by:

$$NEF = V_{noise,rms} \sqrt{2I_{dd}/\pi \cdot UT \cdot 4kT \cdot BW}$$

The NEF can be calculated for the bandwidth of 10 kHz as 10.4. It is possible to design a more efficient amplifier (in terms of NEF), where the better noise performance is obtained by using very large devices. The architecture of the present invention allows a significantly smaller area allocation for the preamplifier, limiting the sizes of the elements used. The area occupied by the preamplifier is 0.076 mm², including the ×10 stage and the bias DAC. The overall channel current consumption (including the sample-and-hold and the ADC) is about 300 µA, mostly due to the inefficient ×10 and VGA stages. The 10-bit ADC was designed for a DNL below 1 LSB and measured a DNL of 0.8 LSB. 1.8 LSB INL was also measured.

An observation was made during the noise measurements of the chip, regarding a better noise immunity of the fully integrated preamplifier compared to a preamplifier with external capacitors. A preamplifier with external capacitors was included on the chip for testing purposes.

Figure 17:
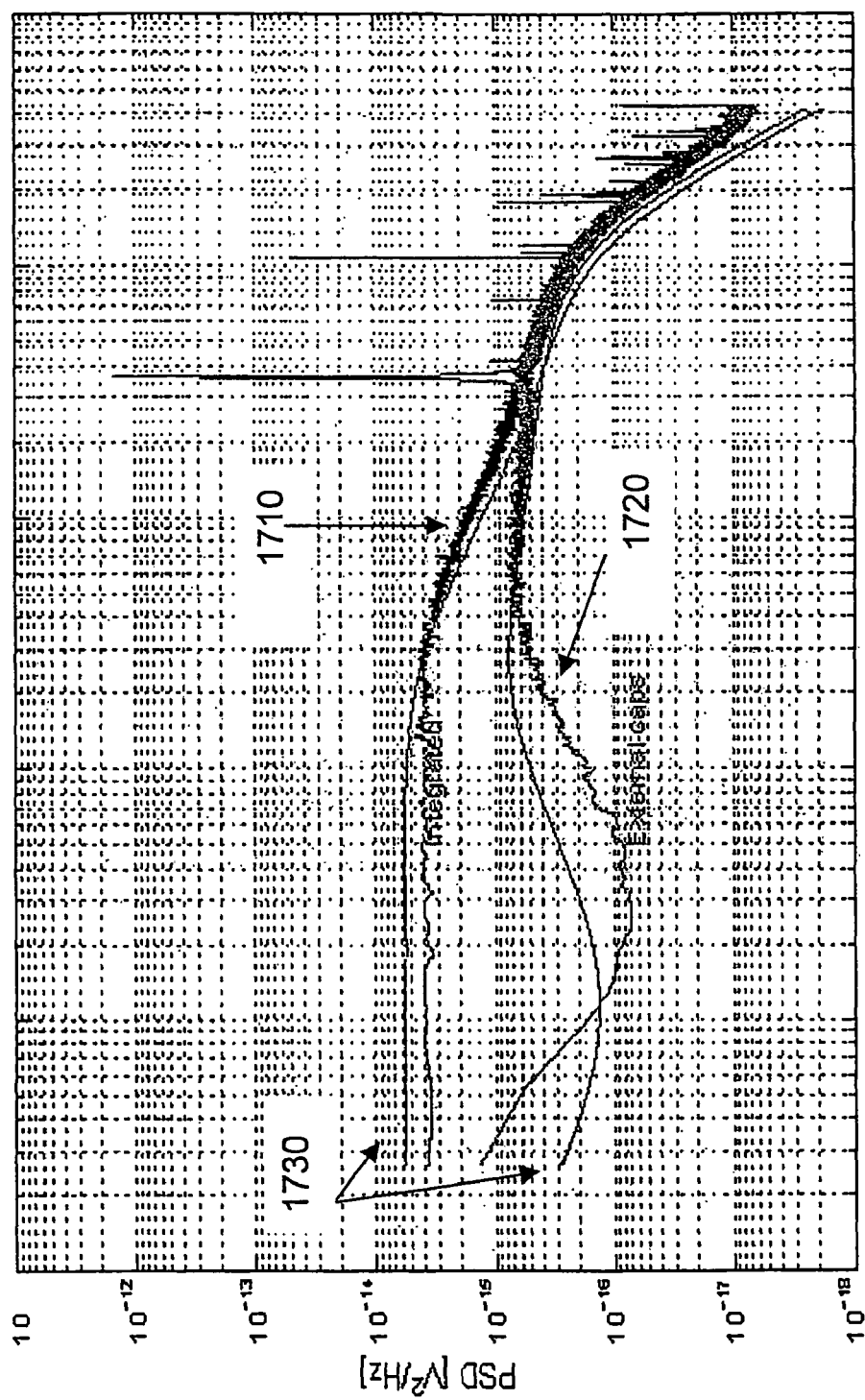
FIG. 17 is a graph of the input-referred noise power spectra for an integrated preamplifier and a preamplifier with external elements.

FIG. 17 is a graph of the input-referred noise power spectra for an integrated preamplifier 1710, as described above with reference to FIG. 10, and a preamplifier, as described above with reference to FIG. 1, with external elements 1720. Simulated results are also shown 1730. A noise measurement was performed simultaneously on the integrated preamplifier and the preamplifier with external capacitors. The circuit with external elements is far more susceptible to external noise sources. It is believed that the noise is induced on the discrete capacitors and inherently longer board tracks due to the presence of the capacitors.

In summary, there has been presented a mixed-signal processor for multi-channel neuronal recording. It receives twelve differential-input channels of implanted recording electrodes. The signals are split at about 200 Hz to low-frequency local field potential (LFP) and high-frequency spike data, band limited by a programmable-cutoff LPF.

Another programmable cutoff filter eliminates the DC component at the input. Amplifier offsets are compensated by means of calibration DAC's. The SPK and LFP channels provide variable amplification rates of up to 5000 and 500, respectively. Input referred noise of 3 μV was measured on the SPK channel and 10 μV on the LFP channel. The two outputs per each channel are converted into digital signals, and the digital controller produces a serial stream at up to 8M bps. The controller can also apply a threshold filter to suppress inactive portions of the signal and emit only spike segments, thus potentially reducing the required communication bandwidth.

A prototype of the processor has been fabricated on a 0.35 μm CMOS process and tested successfully. An FPGA board incorporating an embedded CPU core providing for connectivity between the recording processor and a computer host has been developed along with appropriate real-time software.

Having described the invention with regard to certain specific embodiments thereof, it is to be understood that the description is not meant as a limitation, since further modifications will now suggest themselves to those skilled in the art, and it is intended to cover such modifications as fall within the scope of the appended claims.

REFERENCES

Q. Bai, K. D. Wise, and D. J. Anderson, "A high-yield microassembly structure for three-dimensional microelectrode arrays," *IEEE Trans. Biomed Eng.*, vol. 47, no. 3, pp. 281-289, March 2000.

E. M. Maynard, C. T. Nordhausen, and R. Normann, "The utah intracortical electrode array: a recording structure for potential brain-computer interfaces," *Electroencephalography and clinical Neurophysiology*, vol. 102, pp. 228-239, 1997.

M. Nicolelis, "Actions from thoughts," *Nature*, vol. 409, pp. 403-407, 2001.

R. R. Harrison, "A low-power integrated circuit for adaptive detection of action potentials in noisy signals," in *Proc. of the 25th Annual International Conference of the IEEE EMBS*, September 2003, pp. 3325-3328.

M. S. Lewicki, "A review of methods for spike sorting: the detection and classification of neural action potentials," Network: Computation in Neural Systems, vol. 9, no. 4, pp. R53-R78, 1998.

Z. S. Zumsteg, R. E. Ahmed, G. Santhanam, K. V. Shenoy, and T. H. Meng, "Power feasibility of implantable digital spike-sorting circuits for neural prosthetic systems," in *Proc. of the 26-th Annual International Conference of the IEEE EMBS*, September 2004, pp. 4237-4240.

D. A. Borkholder, "Cell based biosensors using microelectrodes," Ph.D. dissertation, Univ. of Stanford, November 1998.

K. Guillory and R. Normann, "A 100-channel system for real time detection and storage of extracellular spike waveforms," *Journal of Neuroscience Methods*, vol. 91, pp. 21-29, 1999.

I. Obeid, J. C. Morizio, M. A. L. N. K. A. Moxon, and P. D. Wolf, "Two multichannel integrated circuits for neural recording and signal processing," *IEEE Trans. on Biomed. Eng.*, vol. 50, no. 2, pp. 255-258, February 2003.

A. Arieli, A. Sterkin, A. Grinvald, and A. Aertsen, "Dynamics of ongoing activity: Explanation of the large variability in evoked cortical responses," *Science*, vol. 273, pp: 1868-1871, September 1996.

J. P. DONOGHUE, J. N. SANES, N. G. HATSOPOULOS, and G. GML, "Neural discharge and local field potential oscillations in primate motor cortex during voluntary movements," *The Journal of Neurophysiology*, vol. 79, no. 1, pp. 159-173, January 1998.

R. R. Harrison and C. Charles, "A low-power low-noise cmos amplifier for neural recording applications," *IEEE Journal of Solid State Circuits*, vol. 38, no. 6, pp. 958-965, June 2003.

W. R. Patterson, Y. K. Song, C. W. Bull, I. Ozden, A. P. Deangellis, C. Lay, J. L. McKay, A. V. Nurmikko, J. D. Donoghue, and B. W. Connors, "A microelectrode/microelectronic hybrid device for brain implantable neuroprosthesis applications," *IEEE Trans. on Biomed. Eng.*, vol. 51, no. 10, October 2004.

P. Mohseni and K Najafi, "A fully integrated neural recording amplifier with dc input stabilization," *IEEE Trans. on Biomed. Eng.*, vol. 51, no. 5, May 2001.

R. Lemon, *Methods For Neuronal Recording In Conscious Animals*. International Brain Research Organization, 1984.

T. L. Deliyannis, Y. Sun, and J. K. Fidler, *Continuous-Time Active Filter Design*. CRC Press, 1999.

A. B. Schwarz, "Cortial neural prosthetics," *Annual review of Neuroscience*, vol. 27, pp. 487-507, 2004.

M. Black, M. Serruya, E. Bienenstock, Y. Gao, W. Wu, and J. Donoghue, "Connecting brains with machines: the neural control of 2d cursor movement," in *First International IEEE EMBS Conference on Neural Engineering*, 2003.

K. Oweiss, K Thomson, and D. Anderson, "A systems approach for real-time data compression in advanced brain-machine interfaces," in *Proc. of 2nd Int. IEEE EMBS Conf. Neural Eng.*, March 2005, pp. 62-65.

Y. Perelman and R. Ginosar. (2004) Analog front-end IC for multi-channel neuronal recording system with Spike and LFP separation. CCIT Tech. Report 513. [Online]. Available: http://www.ee.technion.ac.il/ran A. Zviagintsev, Y. Perelman, and R. Ginosar, "Low power architectures for spike sorting," in *Proc. of 2nd Int IEEE EMBS Corif. Neural Eng.*, March 2005, pp. 162-165.

A. Zviagintsev, Y. Perelman, and R. Ginosar, "Low power spike detection and alignment algorithm," in *Proc. of 2nd Int. IEEE EMBS Conf. Neural Eng., March* 2005, pp: 317-320.

T. Horiuchi, T. Swindell, D. Sander, and P. Abshire, "A low-power CMOS neural amplifier with amplitude measurements for spike sorting," in *ISCAS*, 2004.

C. Mehring, J. Rickert, E. Vaadia, S. de Oliveira, A. Aertsen, and S. Rotter, "Inference of hand movements from local field potentials in monkey motor cortex," *Nature Neuroscience*, vol. 6, no. 12, pp. 1253-1254, 2003.

T. Instruments. (2004) TMS320C6000 DSP multichannel buffered serial port (McBSP) reference guide. [Online]. Available: http://ti.com Y. Perelman and R. Ginosar. (2005) A low power inverted ladder d/a converter. [Online]. Available: http://www.ee.technion.ac.il/ran Q. Bai and K. Wise, "Single-unit neural recording with active microlectrode arrays," *IEEE Trans. Biomed. Eng.*, vol. 48, no. 8, pp. 911-920, August 2001.

R. Olsson, M. Gulari, and K Wise, "A fully-integrated bandpass amplifier for extracellular neural recording," in *Proc. of the 1st Int. IEEE EMBS Conf. Neural Eng.*, March 2003, pp. 165-168.

D. Chen, J. Harris, and J. Principe, "A bio-amplifier with pulse output," in *26th Ann. Intm. Conf. IEEE EMBS, Proc.*, September 2004.

M. Steyaert, W. Sansen, and A. Zhongyuan, "A micropower low-noise monolithic instrumentation amplifier for medical purposes," *IEEE Journal of Solid State Circuits*, vol. 22, no. 6, pp. 1163-1168, 1987.

We claim:

1. A system for multi-channel neuronal recording with spike/local field potential (LFP) separation and integrated analog-to-digital (A/D) conversion, the system comprising:
   a programmable cutoff high pass filter (HPF) for blocking DC and low frequency input drift;
   a band-splitter to separate the analog signals to low-frequency LFP and high-frequency spike data (SPK), said high-frequency band being limited by a programmable-cutoff low-pass filter (LPF); and
   A/D converters for converting said analog signals into bits.

2. The system of claim 1, wherein the SPK and LFP channels provide variable amplification rates of up to 5000 and 500, respectively.

3. The system of claim 1, further comprising a calibration digital-to-analog converter (DAC) for each of a plurality of channels to compensate amplifier offsets.

4. The system of claim 1, further comprising a threshold filter to suppress inactive portions of the signal and emit only spike segments of programmable length.

5. The system of claim 1, wherein said system provides threshold detection.

6. The system of claim 5, wherein a predetermined number of samples is produced as a result of said threshold detection.

7. The system of claim 6, wherein said predetermined number of samples comprises a first predetermined number of samples taken prior to said threshold detection, and a second predetermined number of samples taken after said threshold detection.

8. The system of claim 1, wherein said analog signals are converted into digital form, and streamed out over a serial digital bus.

9. The system of claim 1, further comprising an interface sub-system, said sub-system comprising:
   an embedded CPU core in a programmable logic device; and
   real-time software to allow connectivity to a computer host.

10. The system of claim 1, wherein said system is integrated on a chip, and further comprising an on-chip controller responsible for communication with a separate host, chip timing, internal register access, channel readout and spike detection.

11. The system of claim 10, wherein the registers of said channels and said A/D converters are accessed through an internal parallel bus, and mastered by said controller.

12. The system of claim 10, wherein said controller has two modes: programming and streaming.

13. The system of claim 12, wherein in said programming mode contents of said registers can be stored and fetched by said host.

14. The system of claim 12, wherein in said streaming mode said controller continuously polls said channel ADC's, checks for threshold crossing events on every channel and transmits active signal segments to said host.

15. The system of claim 12, wherein any subset of said plurality of channels can be enabled for data streaming.

16. The system of claim 12, wherein a threshold crossing event is triggered for one of said plurality of channels when the output of this channel falls below a low threshold.

17. The system of claim 12, wherein a threshold crossing event is triggered for one of said plurality of channels when the output of this channel rises above a high threshold.

18. The system of claim 17, wherein a number of samples from that channel will be communicated to said host following said threshold crossing event.

19. The system of claim 18, wherein said threshold values and the number of samples to transmit after a threshold event are programmable.

20. The system of claim 12, wherein the entire data stream, without clipping, can be obtained from said chip by setting a low threshold and a high threshold identically.

21. The system of claim 1, wherein said LPF has a range of 8-13 kHz.

22. The system of claim 1 wherein said band splitter has a split frequency of approximately 200 Hz.

23. A method for multi-channel neuronal recording with spike/local field potential (LFP) separation and integrated analog-to-digital (A/D) conversion, said method comprising:
   blocking DC and low frequency input drift using a programmable cutoff high pass filter (HPF);
   separating the analog signals to low-frequency LFP and high-frequency spike data (SPK) using a band-splitter, said high-frequency band being limited by a programmable-cutoff low-pass filter (LPF); and
   converting said analog signals into bits using A/D converters.

* * * * *